US007651192B2

(12) United States Patent
Yamanobe

(10) Patent No.: US 7,651,192 B2
(45) Date of Patent: Jan. 26, 2010

(54) LIQUID DROPLET DEPOSITION METHOD AND LIQUID DROPLET DEPOSITION APPARATUS

(75) Inventor: Jun Yamanobe, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 132 days.

(21) Appl. No.: 12/057,216

(22) Filed: Mar. 27, 2008

(65) Prior Publication Data

US 2008/0238973 A1 Oct. 2, 2008

(30) Foreign Application Priority Data

Mar. 30, 2007 (JP) .............................. 2007-095516

(51) Int. Cl.
*B41J 29/393* (2006.01)
(52) U.S. Cl. ............................... 347/19; 347/9; 347/75
(58) Field of Classification Search .................... 347/19
See application file for complete search history.

(56) References Cited

U.S. PATENT DOCUMENTS

2004/0217186 A1* 11/2004 Sachs et al. .................... 239/11
2008/0166471 A1* 7/2008 Kawase ......................... 427/58

FOREIGN PATENT DOCUMENTS

JP 2001-239661 A 9/2001

* cited by examiner

*Primary Examiner*—Matthew Luu
*Assistant Examiner*—Brian J Goldberg
(74) *Attorney, Agent, or Firm*—Birch, Stewart, Kolasch & Birch, LLP

(57) ABSTRACT

A liquid droplet deposition method of consecutively depositing a plurality of droplets of liquid, which contains solvent and particles dispersed in the solvent and having a substantially uniform size, onto a recording medium includes the steps of: determining target positions at which the plurality of droplets are to be deposited on the recording medium; depositing an X-th droplet of the droplets at an X-th target position of the determined target positions on the recording medium, X being a natural number; and depositing an (X+1)-th droplet of the droplets at an (X+1)-th target position of the determined target positions on the recording medium subsequently to the X-th droplet, after the particles contained in the X-th droplet are aggregated to form an X-th particle aggregate on the recording medium due to liquid bridging force, wherein in the determining step, the target positions are determined so as to satisfy following conditions:

$$L(C_X, C_{X+1}) \leq r_X + r\_max_{X+1}, \text{ and}$$

$$L(P_X, C_{X+1}) \geq r\_max_{X+1},$$

where $C_X$ is the X-th target position, $C_{X+1}$ is the (X+1)-th target position, $L(C_X, C_{X+1})$ is a distance between $C_X$ and $C_{X+1}$, $r_X$ is a radius of the solvent of the X-th droplet on the recording medium at a time of depositing the (X+1)-th droplet on the recording medium, $r\_max_{X+1}$ is a radius of the solvent of the (X+1)-th droplet at a time of maximumly spreading on the recording medium, $P_X$ is a position of an edge of the X-th particle aggregate on a line connecting $C_X$ and $C_{X+1}$, and $L(P_X, C_{X+1})$ is a distance between $P_X$ and $C_{X+1}$.

16 Claims, 14 Drawing Sheets

14-1  14-2

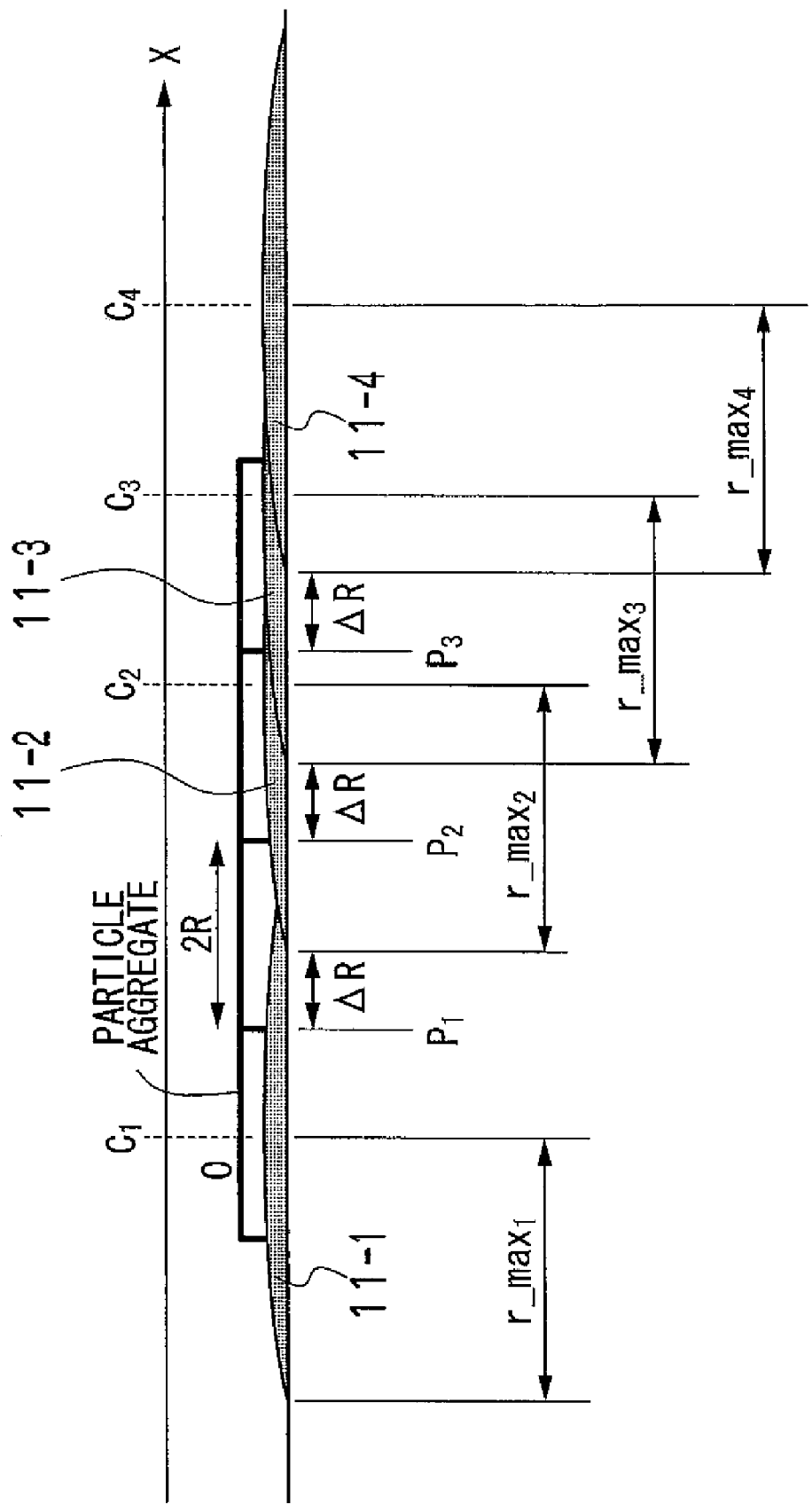

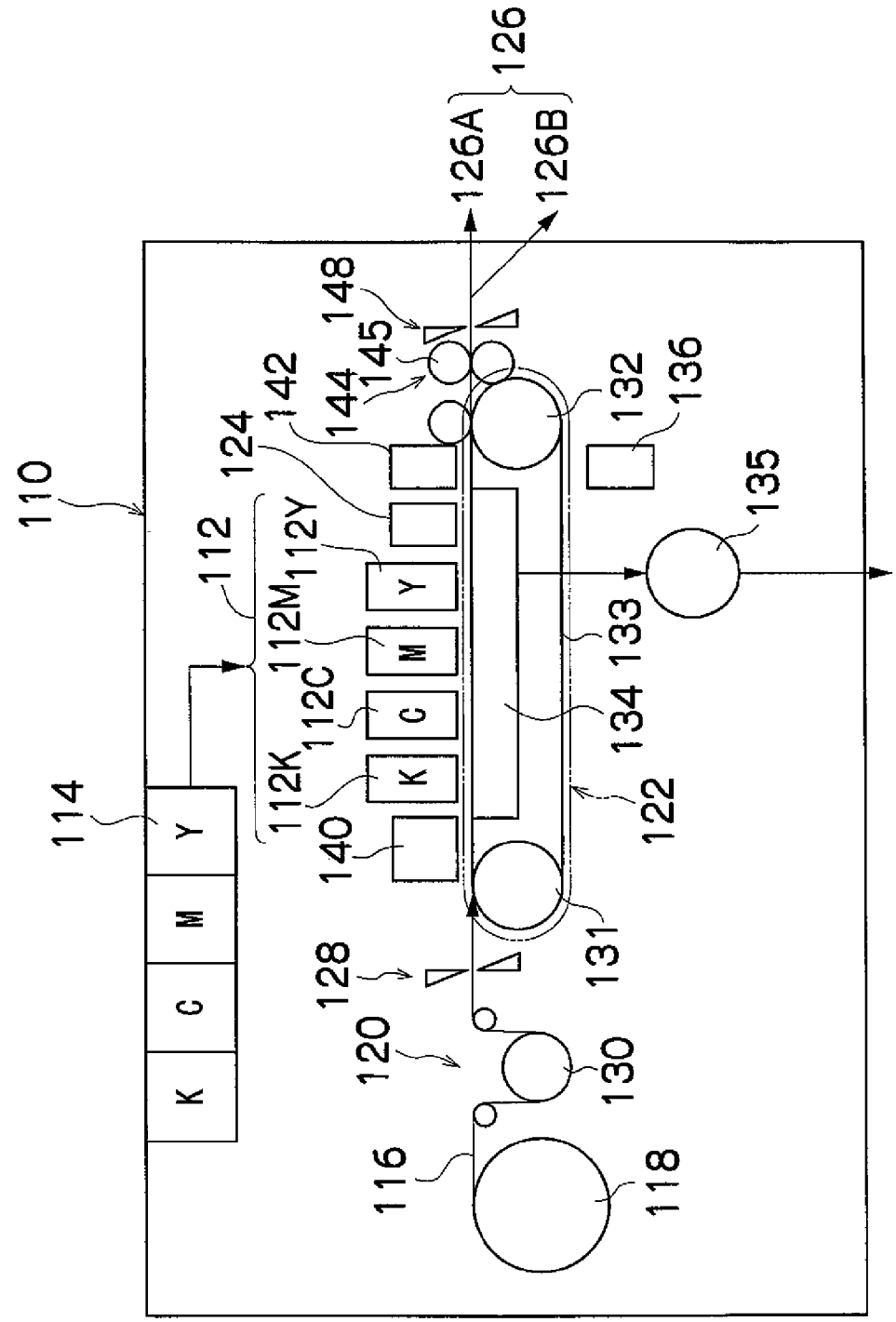

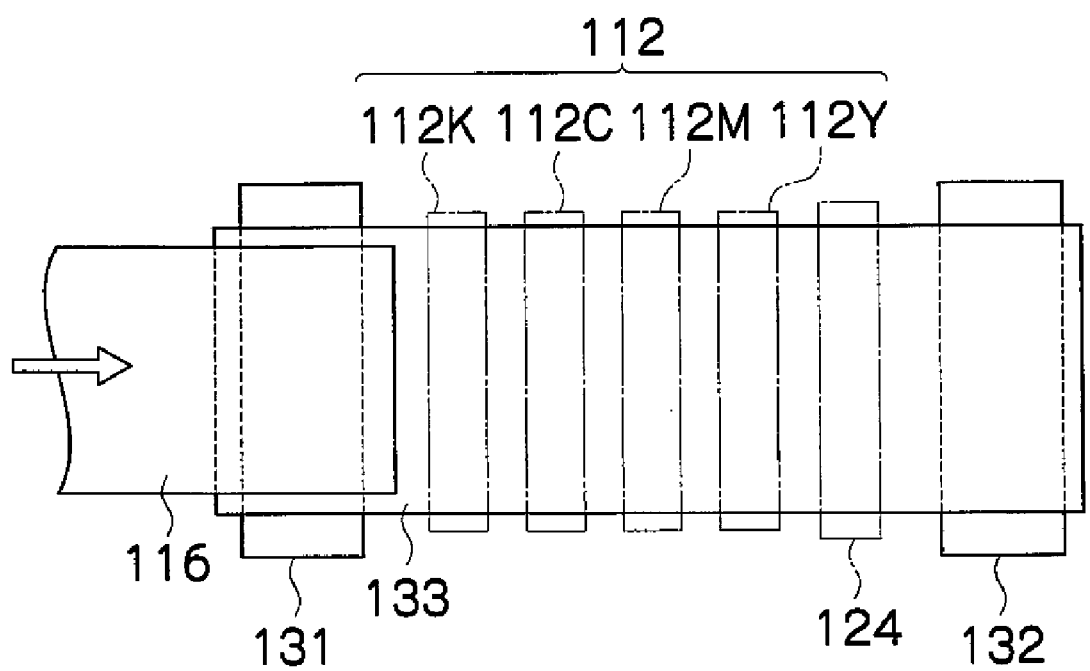

LIQUID DROPLET DEPOSITION METHOD AND LIQUID DROPLET DEPOSITION APPARATUS

BACKGROUND OF THE INVENTION

1. Field of the Invention

The present invention relates to a liquid droplet deposition method and a liquid droplet deposition apparatus, and more particularly, to a liquid droplet deposition method and a liquid droplet deposition apparatus for an inkjet recording system.

2. Description of the Related Art

Technology has been known in which liquid containing particles of uniform particle size dispersed therein is ejected in the form of liquid droplets by an inkjet method, thereby depositing the droplets on a recording medium. The particles contained in the droplets deposited on the recording medium then aggregate due to a self-organizing action caused by a liquid bridging force, resulting in the formation of an aggregate of the particles on the recording medium.

Here, Japanese Patent Application Publication No. 2001-239661 discloses using the technology described above to create a printed object by means of interference colors, rather than normal generation of colors based on light absorption.

Although Japanese Patent Application Publication No. 2001-239661 discloses that the droplets are deposited in mutual proximity on the recording medium when liquid droplets are ejected continuously, it does not disclose concrete conditions, such as the time interval between the ejection of mutually adjacent liquid droplets, or the distance between deposited liquid droplets.

Here, if droplets are deposited in mutual proximity on the recording medium, without specifying concrete conditions, such as the time intervals between the ejection of mutually adjacent liquid droplets, and the distance between droplet depositing positions, then depositing interference occurs between the mutually adjacent liquid droplets. In particular, since the recording medium in the Japanese Patent Application Publication No. 2001-239661 has hydrophobic properties, then marked depositing interference appears. Consequently, it becomes difficult to deposit liquid droplets at desired positions, and in particular, it is difficult to create thin lines on the recording medium.

SUMMARY OF THE INVENTION

The present invention has been contrived in view of these circumstances, an object thereof being to provide a liquid droplet deposition method and a liquid droplet deposition apparatus which are capable of forming a line image at a desired position on a recording medium, by preventing the depositing interference between mutually adjacent liquid droplets.

In order to attain the aforementioned object, the present invention is directed to a liquid droplet deposition method of consecutively depositing a plurality of droplets of liquid onto a recording medium, the liquid containing solvent and particles dispersed in the solvent, the particles having a substantially uniform size, the method comprising the steps of: determining target positions at which the plurality of droplets are to be deposited on the recording medium; depositing an X-th droplet of the droplets at an X-th target position of the determined target positions on the recording medium, X being a natural number; and depositing an (X+1)-th droplet of the droplets at an (X+1)-th target position of the determined target positions subsequently to the X-th droplet, after the particles contained in the X-th droplet are aggregated to form an X-th particle aggregate on the recording medium due to liquid bridging force, wherein in the determining step, the target positions are determined so as to satisfy following conditions:

$$L(C_X, C_{X+1}) \leq r_X + r\_max_{X+1}, \text{ and}$$

$$L(P_X, C_{X+1}) \geq r\_max_{X+1},$$

where $C_X$ is the X-th target position, $C_{X+1}$ is the (X+1)-th target position, $L(C_X, C_{X+1})$ is a distance between $C_X$ and $C_{X+1}$, $r_X$ is a radius of the solvent of the X-th droplet on the recording medium at a time of depositing the (X+1)-th droplet on the recording medium, $r\_max_{X+1}$ is a radius of the solvent of the (X+1)-th droplet at a time of maximumly spreading on the recording medium, $P_X$ is a position of an edge of the X-th particle aggregate on a line connecting $C_X$ and $C_{X+1}$, and $L(P_X, C_{X+1})$ is a distance between $P_X$ and $C_{X+1}$.

In this aspect of the present invention, it is possible to prevent the solvent of the (X+1)-th droplet from entering into the X-th aggregated particle body, and the self-assembled arrangement of the X-th aggregated particle body is not broken down. At the same time, it is possible to cause the solvent in the (X+1)-th droplet and the solvent in the X-th droplet to come into contact with each other, reliably. Hence, it is possible to form the particle aggregates of mutually adjacent liquid droplets into a unified body.

Preferably, in the determining step, the target positions are determined so that $L(C_X, C_{X+1})$ is greater when X=1 than when X≧2.

In this aspect of the present invention, the X-th particle aggregate for X=3 unites with the combined aggregate having been formed of the first and third particle aggregates (i.e., X-th particle aggregates for X=1 and 2), and therefore it is possible to form a combined aggregate in which the first particle aggregate (X=1), the second particle aggregate (X=2) and the third particle aggregate (X=3) are all united together. A combined aggregate can also be formed by uniting the fourth particle aggregate (X=4) and subsequent particle aggregates, and hence it is possible to form a line image reliably on the recording medium, without the occurrence of any shortfall in the supply of particles.

Preferably, in the determining step, the target positions are determined so that $L(C_X, C_{X+1})$ is equal to a diameter of the X-th particle aggregate, when X≧2.

In this aspect of the present invention, it is possible to form a line image reliably on the recording medium, while maintaining a uniform supply volume of the particles.

Preferably, the X-th droplet for X=1 has a concentration of the particles lower than the X-th droplet for X≧2.

In this aspect of the present invention, the third particle aggregate unites with the combined aggregate body created by the uniting of the first and second particle aggregates, and therefore it is possible to form a combined aggregate in which the first to third particle aggregates are all united together. A combined aggregate can also be formed by uniting the fourth particle aggregate and subsequent particle aggregates, and hence it is possible to form a line image reliably on the recording medium, without the occurrence of any shortfall in the supply of particles.

Preferably, the X-th droplet for X=1 has a volume smaller than the X-th droplet for X≧2.

In this aspect of the present invention, the third particle aggregate unites with the combined aggregate created by the uniting of the first and second particle aggregates, and therefore it is possible to form a combined aggregate in which the first to third particle aggregates are all united together. A combined aggregate can also be formed by uniting the fourth particle aggregate and subsequent particle aggregates, and hence it is possible to form a line image reliably on the recording medium, without the occurrence of any shortfall in the supply of particles.

Preferably, the concentration of the X-th droplet for $X \geq 2$ is set so that the X-th particle aggregate for $X \geq 2$ has a diameter equal to $L(C_X, C_{X+1})$.

Preferably, the volume of the X-th droplet for $X \geq 2$ is set so that the X-th particle aggregate for $X \geq 2$ has a diameter equal to $L(C_X, C_{X+1})$.

In these aspects of the present invention, it is possible to form a line image reliably on the recording medium, while maintaining a uniform supply volume of the particles.

Preferably, a diameter D of the particles, a volume V of the droplet, and a contact angle θ of the liquid on the recording medium have a relationship of $D > \{3 \times V \times (1-\cos\theta)/\pi/(2+\cos\theta)\}^{1/3}$.

In this aspect of the present invention, it is possible to form a particle aggregate more reliably on the recording medium, by aggregation of the particles due to a self-organizing action caused by the liquid bridging force.

In order to attain the aforementioned object, the present invention is also directed to a liquid droplet deposition apparatus comprising: an ejection head which ejects and deposits a plurality of droplets of liquid onto a recording medium, the liquid containing solvent and particles dispersed in the solvent, the particles having a substantially uniform size; a control device which determines target positions at which the plurality of droplets are to be deposited on the recording medium, and controls the ejection head to deposit an X-th droplet of the droplets at an X-th target position of the determined target positions and to deposit an (X+1)-th droplet of the droplets at an (X+1)-th target position of the determined target positions subsequently to the X-th droplet, X being a natural number, the (X+1)-th droplet being deposited after the particles contained in the X-th droplet are aggregated to form an X-th particle aggregate on the recording medium due to liquid bridging force, wherein the control device determines the target positions so as to satisfy following conditions:

$$L(C_X, C_{X+1}) \leq r_X + r\_max_{X+1}, \text{ and}$$

$$L(P_X, C_{X+1}) \geq r\_max_{X+1},$$

where $C_X$ is the X-th target position, $C_{X+1}$ is the (X+1)-th target position, $L(C_X, C_{X+1})$ is a distance between $C_X$ and $C_{X+1}$, $r_X$ is a radius of the solvent of the X-th droplet on the recording medium at a time of depositing the (X+1)-th droplet on the recording medium, $r\_max_{X+1}$ is a radius of the solvent of the (X+1)-th droplet at a time of maximumly spreading on the recording medium, $P_X$ is a position of an edge of the X-th particle aggregate on a line connecting $C_X$ and $C_{X+1}$, and $L(P_X, C_{X+1})$ is a distance between $P_X$ and $C_{X+1}$.

In this aspect of the present invention, it is possible to prevent the solvent of the (X+1)-th droplet from entering into the X-th aggregated particle body, and the self-assembled arrangement of the X-th aggregated particle body is not broken down. At the same time, it is possible to cause the solvent in the (X+1)-th droplet and the solvent in the X-th droplet to come into contact with each other, reliably. Hence, it is possible to form the particle aggregates of mutually adjacent liquid droplets into a unified body.

Preferably, the control device determines the target positions so that $L(C_X, C_{X+1})$ is greater when X=1 than when $X \geq 2$.

Preferably, the control device determines the target positions so that $L(C_X, C_{X+1})$ is equal to a diameter of the X-th particle aggregate, when $X \geq 2$.

Preferably, the control device controls the ejection head so that the X-th droplet for X=1 has a concentration of the particles lower than the X-th droplet for $X \geq 2$.

Preferably, the control device controls the ejection head so that the X-th droplet for X=1 has a volume smaller than the X-th droplet for $X \geq 2$.

Preferably, the concentration of the particles in the X-th droplet for $X \geq 2$ is set so that the X-th particle aggregate for $X \geq 2$ has a diameter equal to $L(C_X, C_{X+1})$.

Preferably, the volume of the X-th droplet for $X \geq 2$ is set so that the X-th particle aggregate for $X \geq 2$ has a diameter equal to $L(C_X, C_{X+1})$.

Preferably, the control device controls the ejection head so that a volume V of the droplet, a diameter D of the particles, and a contact angle θ of the liquid on the recording medium have a relationship of $D > \{3 \times V \times (1-\cos\theta)/\pi/(2+\cos\theta)\}^{1/3}$.

According to the present invention, it is possible to form a line image at a prescribed position on the recording medium, by preventing depositing interference between liquid droplets that are deposited at mutually adjacent positions.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 8 is an illustrative diagram of the positional relationships, in a case where three or more droplets are deposited consecutively;

FIG. 9 is a general schematic drawing of an inkjet recording apparatus;

FIG. 10 is a plan view of the principal part of the peripheral area of a print unit in the inkjet recording apparatus shown in FIG. 9;

DETAILED DESCRIPTION OF THE PREFERRED EMBODIMENTS

Description of Liquid Droplet Deposition Method

The present invention uses technology (hereinafter, referred to as "particle self-organization technology") whereby a liquid which contains particles of uniform particle size dispersed therein is ejected in the form of liquid droplets by means of an inkjet method, onto a recording medium, and an aggregate of the particles is formed on the recording medium due to the particles aggregating as a result of a self-organizing action caused by a liquid bridging force.

Firstly, the particle self-organization technology will be described.

Figure 1A:
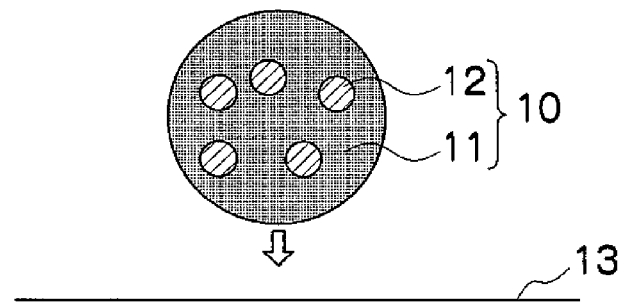
FIGS. 1A to 1C are diagrams showing one example of particle self-organization technology which is used in the present invention.
Figure 1B:
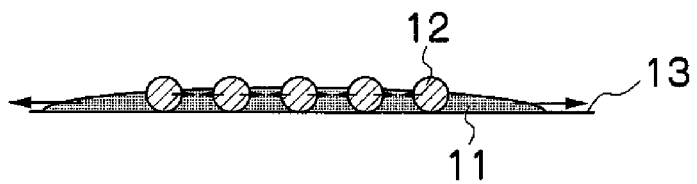
Figure 1C:
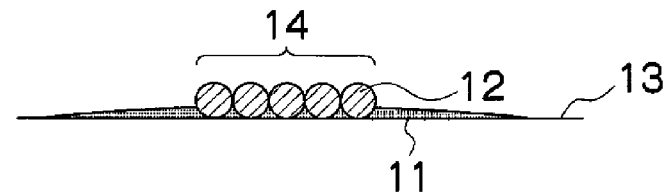

FIGS. 1A to 1C are diagrams showing one example of particle self-organization technology used in the present invention. As shown in FIG. 1A, a liquid droplet 10 which contains particles 12 dispersed therein is ejected and deposited on a recording medium 13. The particles 12 dispersed in the liquid droplet 10 have a large and uniform particle size. The recording medium 13 is a medium which receives the recording of an image (and is also referred to as a print medium, an image forming medium, a recording medium, an image receiving medium, or the like), and it includes various media, regardless of their material or shape, such as continuous paper, cut paper, seal paper, film, cloth, printed substrates, cardboard, metal plates, and the like. In the present embodiment, the recording medium 13 has liquid-philicity. In this case, the term "liquid-philicity" means "having an affinity for the liquid (e.g., ink)". For example, a recording medium of which printing surface has been subjected to hydrophilic treatment (e.g., corona treatment) may be used for the recording medium 13.

The recording medium 13 thus has liquid-philic properties, and the solvent 11 of the liquid droplets 10 hence wets and spreads immediately on the recording medium 13 after depositing thereon, as shown in FIG. 1B. Since the particle has a relatively large diameter, then the upper portion of the particle 12 projects out above the solvent 11 (i.e., the particle 12 projects from the surface of the solvent 11 that has spread as shown in FIG. 1B). In this case, a liquid bridging force (i.e., a force which is based on the surface tension of the liquid between two adjacent particles) acts between the particles 12, and the particles 12 become regularly arrayed due to a self-organizing action. The group of particles which are regularly arrayed in this way due to the self-organizing action are represented as a particle aggregate 14.

In order to form a particle aggregate 14 in this way, it is necessary to satisfy the following conditions:

$$D > \left[ \frac{3 \times V \times (1-\cos\theta)}{\pi \times (2+\cos\theta)} \right]^{1/3}, \quad (1)$$

where $\theta$ is a contact angle between the recording medium 13 and the solvent 11 used, D is a diameter of the particles 12, and V is a volume of the ejected droplet.

Figure 2A:
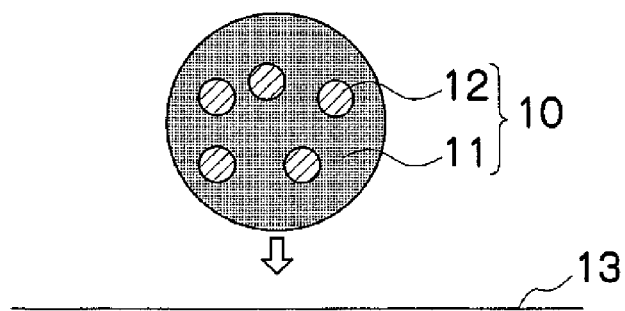
FIGS. 2A to 2D are diagrams showing one example of particle self-organization technology which is used in the present invention.
Figure 2B:
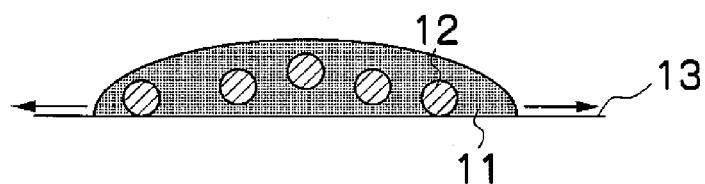
Figure 2C:
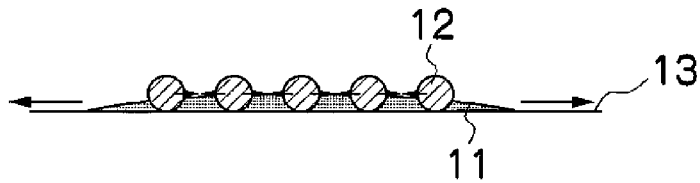
Figure 2D:
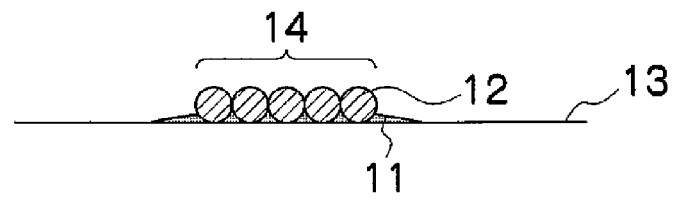

In cases where the recording medium 13 has a low liquid-philicity, the solvent 11 of the liquid droplet 10 may not readily wet and spread immediately after depositing onto the recording medium 13, as shown in FIG. 2B. However, since the liquid bridging force between the particles 12 is gradually generated as the solvent 11 dries as shown in FIG. 2C, then it is possible to eventually obtain the particle aggregate 14 in which the particles 12 have been regularly arrayed by the self-organizing action, as shown in FIG. 2D.

It is possible to achieve self-organization which is used in the present invention, provided that the following conditions, for example, are satisfied:

density of the particles 12: $\rho_P = 2.2 \times 10^3$ kg/m$^3$;
density of the solvent 11: $\rho_L = 1.0 \times 10^3$ kg/m$^3$;
percentage by mass of the particles: D=50%;
liquid droplet volume: $V = 1.0 \times 10^{-14}$ m$^3$;
particle radius $r = 5.0 \times 10^{-7}$ m; and
contact angle of the liquid droplet: $\theta = 1°$.

The radius R of the liquid droplets can be expressed by the following equation:

$$R = \left[ \frac{3 \times (1+\cos\theta) \times \sin\theta}{\pi \times (1-\cos\theta) \times (2+\cos\theta)} \times V \right]^{1/3}. \quad (2)$$

According to the equation (2), the radius can be calculated as $R = 9.0 \times 10^{-5}$ m.

Furthermore, the spreading surface area SL of the liquid droplet can be represented by the following equation:

$$S_L = \pi \times R^2 \quad (3).$$

From the equation (3), the spreading surface area can be calculated as $S_L = 2.5 \times 10^{-8}$ m$^2$.

Furthermore, the height H of the liquid droplet can be expressed by the following equation:

$$H = \left[ \frac{3 \times (1-\cos\theta)}{\pi \times (2+\cos\theta)} \times V \right]^{1/3}. \quad (4)$$

From the equation (4), the height of the liquid droplet can be determined as $H = 7.9 \times 10^{-7}$ m.

Furthermore, the total weight of particles $W_p$ per droplet can be expressed by the following equation:

$$W_p = \frac{\frac{D}{100}}{1 - \left(\frac{D}{100}\right)} \times \rho_L \times V. \quad (5)$$

According to the equation (5), the weight of particles can be determined as $W_p = 1.0 \times 10^{-11}$ kg.

Furthermore, the total number of particles N in a liquid droplet can be expressed by the following equation:

$$N = \frac{W_p}{\rho_P \times \frac{4 \times \pi \times r^3}{3}}. \quad (6)$$

According to the equation (6), the total number of particles in one liquid droplet is calculated as $N = 8.7 \times 10^3$.

Furthermore, the total surface area $S_p$ (the occupied surface area when the particles are regularly arrayed in a single layer) occupied by the particles can be expressed by the following equation:

$$S_p = 2 \times \sqrt{3} \times r^2 \times N \quad (7).$$

From the equation (7), the surface area occupied by the particles is calculated as $S_P = 7.5 \times 10^{-9}$ m².

Another example of the conditions for achieving the self-organization of the particles is as follows:
- density of the particles 12: $\rho_P = 2.2 \times 10^3$ kg/m³;
- density of the solvent 11: $\rho_L = 1.0 \times 10^3$ kg/m³;
- percentage by mass of the particles: D=50%;
- liquid droplet volume: $V = 1.0 \times 10^{-15}$ m³;
- particle radius $r = 5.0 \times 10^{-7}$ m; and
- contact angle of the liquid droplet: $\theta = 4°$.

In this case, parameters of R, $S_L$, $W_p$, N and $S_p$ can be calculated as $R = 2.6 \times 10^{-5}$ m, $S_L = 2.2 \times 10^{-9}$ m², $W_p = 1.0 \times 10^{-12}$ kg, $N = 8.7 \times 10^2$ and $S_p = 7.5 \times 10^{-10}$ m², by means of the equations (2) to (7).

In cases where the liquid droplet volume (i.e., $V = 1.0 \times 10^{-15}$ m³) is small as in the case of this example, then using a normal inkjet method, the particles may become blocked in the nozzle sections, leading to ejection failures. Hence, in such cases, it is desirable that a so-called "nozzle-less" inkjet system is used, as disclosed in Japanese Patent Application Publication No. 2006-334818.

The explanation given above relates to the particle self-organization technology.

Next, the conditions for ejecting two liquid droplets 10 according to an embodiment of the present invention will be described. In the present embodiment, the conditions relating to the interval between ejection times and the distance between depositing positions of the droplets are optimized.

Figure 3A:
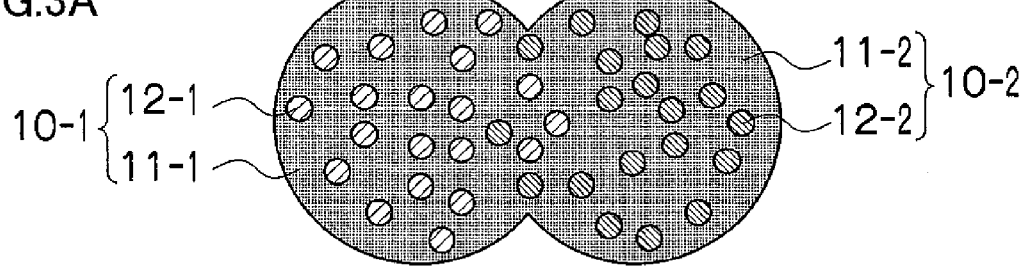
FIGS. 3A and 3B are diagrams showing a state of particles when two liquid droplets are not ejected under conditions regarding the ejection time interval according to an embodiment of the present invention.
Figure 3B:
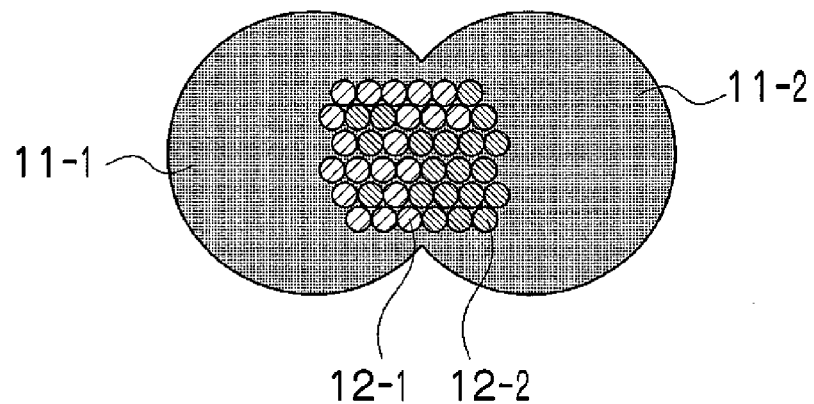

Firstly, in order to explain the importance of optimizing conditions for the ejection time interval, a hypothetical case where conditions of the ejection time interval according to the present embodiment are not satisfied, will be described. FIGS. 3A and 3B are diagrams showing a state of particles when two liquid droplets are not ejected under conditions regarding the ejection time interval according to the present embodiment of the present invention. In FIGS. 3A and 3B, for the sake of convenience, the particles 12-1 contained in the first liquid droplet 10-1 and the particles 12-2 contained in the second liquid droplet 10-2 are labeled with different symbols, but in actual practice, they are the same particles.

In the case shown in FIG. 3A, since liquid ejection is not carried out under the preferable conditions of the ejection time interval, then a second liquid droplet 10-2, which is ejected secondly, is deposited onto the recording medium 13 before a particle aggregate 14-1 of the first liquid droplet 10-1, which is ejected firstly, is formed. This phenomenon occurs when a time period to and an interval $\Delta t$ have a relationship of $t_0 \geq \Delta t$. In this case, to is a time period from the time at which the first liquid droplet 10-1 is deposited onto the recording medium 13 until the particle aggregate 14-1 is formed, and $\Delta t$ is an interval between the ejection time point for the first droplet and the ejection time point for the second droplet.

In this case, the first liquid droplet 10-1 and the second liquid droplet 10-2 combine together and form a substantially elliptical shape, and the combined droplet contains therein the particles 12-1 derived from the first droplet and the particles 12-2 derived from the second droplet. Hence, these particles in the combined droplet are mixed with each other and are self-organized, resulting the formation of a particle aggregate having an elliptical shape.

On the other hand, in the present embodiment, liquid ejection is performed under the following conditions regarding the ejection time interval:

$$t_0 < \Delta t \quad (8).$$

Figure 4A:
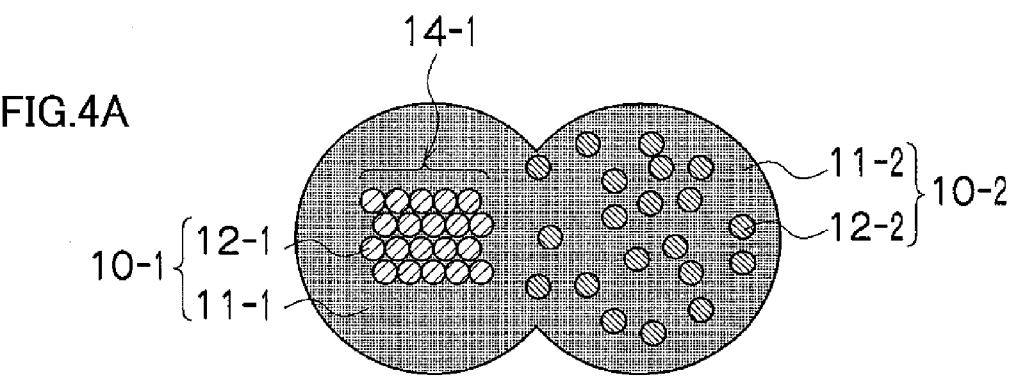
FIGS. 4A and 4B show a state of particles when two liquid droplets are ejected under conditions regarding the ejection time interval according to an embodiment of the present invention.
Figure 4B:
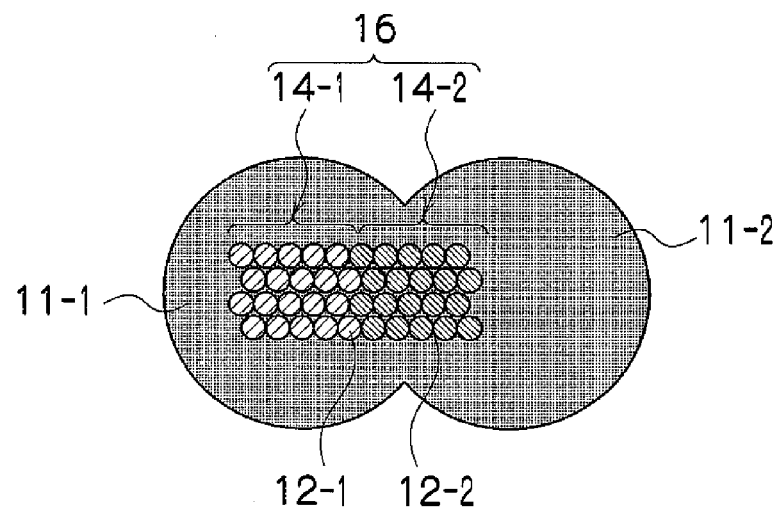

By satisfying the conditions of the inequality equation (8), then as shown in FIGS. 4A and 4B, the particles 12-2 of the second liquid droplet 10-2 form a particle aggregate 14-2 so that the particle aggregate 14-2 unites with the particle aggregate 14-1 that has been formed by the particles 12-1 of the first droplet 10-1. Below, the combined aggregate of the particle aggregate 14-1 and the particle aggregate 14-2 is denoted with the reference numeral "16".

Figure 5:
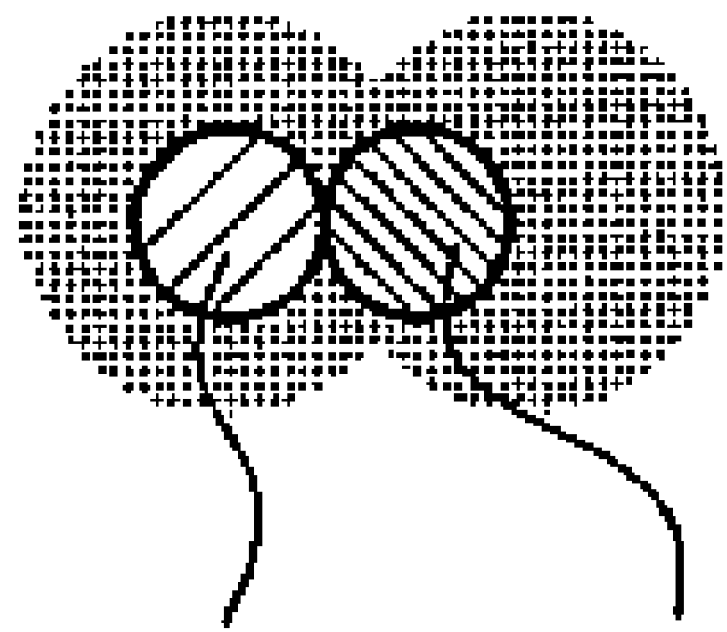
FIG. 5 is a supplementary diagram with respect to FIGS. 4A and 4B.

FIG. 5 is a diagram showing the actual shape of the particle aggregates 14-1 and 14-2. In order to illustrate the state of the particles 12, the particle aggregates 14-1 and 14-2 are represented by arranging the particles 12, and hence the particle aggregates 14-1 and 14-2 are depicted to have a shape of a substantially elliptical shape in FIGS. 4A and 4B. However, the particle aggregates 14-1 and 14-2 actually have a circular shape, as shown in FIG. 5.

Figure 6:
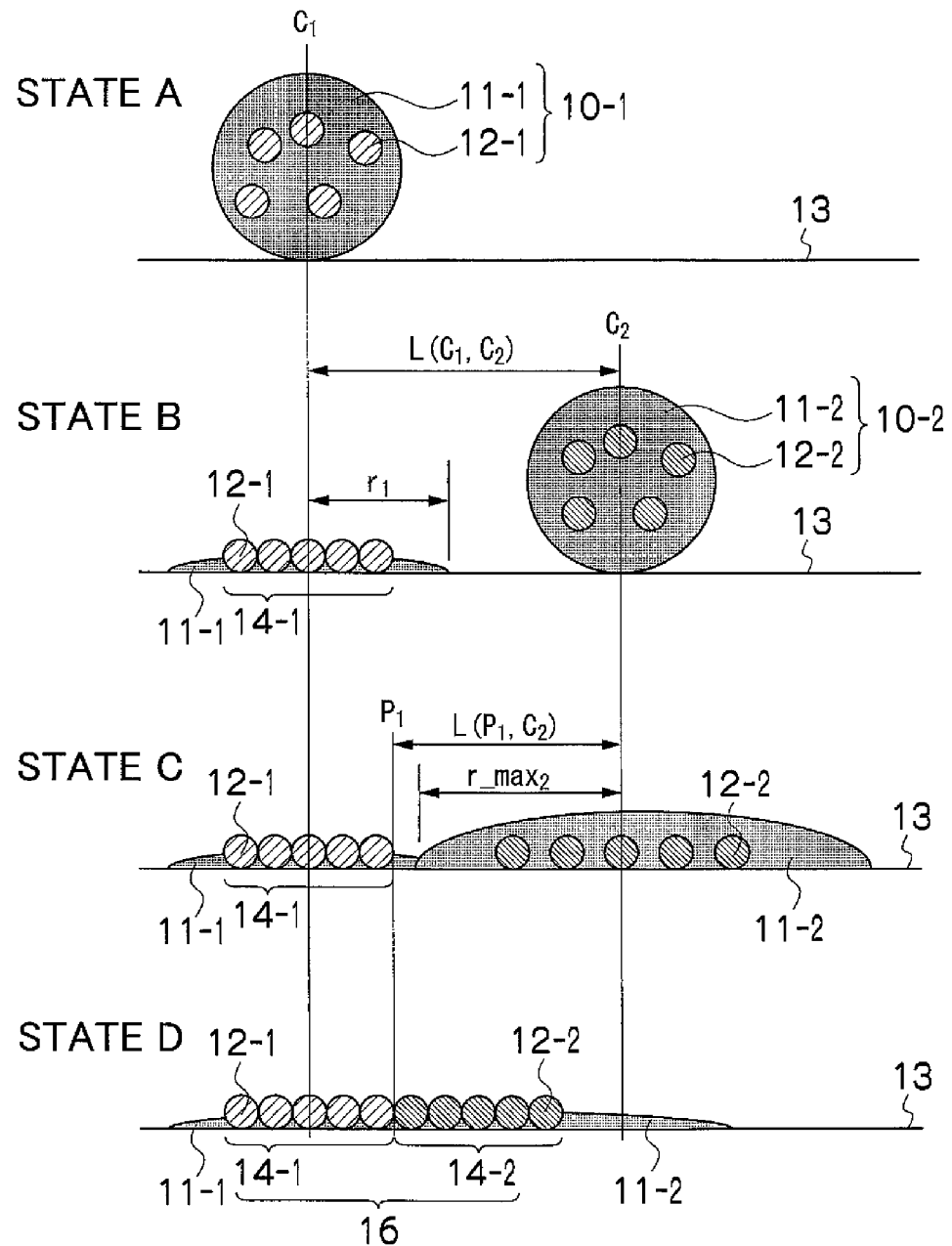
FIG. 6 is a diagram showing the distance between deposited positions of two droplets, when two droplets are deposited.

Next, the conditions relating to the distance between the droplet depositing positions under the ejection time interval conditions described above, will be explained. FIG. 6 is a diagram illustrating conditions of the distance between the deposited positions of two droplets.

As shown in the state "A" of FIG. 6, firstly, the first liquid droplet 10-1 is deposited onto the recording medium 13. Thereupon, after the particle aggregate 14-1 of the first liquid droplet 10-1 has been formed, the second liquid droplet 10-2 is deposited onto the recording medium 13 as shown in the state "B" of FIG. 6. In other words, the first liquid droplet 10-1 and the second liquid droplet 10-2 are deposited on the recording medium 13 under conditions of $t_0 < \Delta t$ expressed by the inequality equation (8). In the state "B" of FIG. 6, "$r_1$" indicates the spreading radius of the solvent 11-1 in the first droplet 10-1.

Next, as shown in the state "C" of FIG. 6, the solvent 11-2 of the second droplet 10-2 wets and spreads on the recording medium 13. In the state "C" of FIG. 6, "$r\_max_2$" indicates a radius of the solvent 11-2 of the second droplet 10-2 at a time of maximumly spreading on the recording medium 13. In this case, if the solvent 11-2 of the second droplet spreads and enters into the particle aggregate 14-1 of the first droplet, then the particle aggregate 14-1 of the first droplet is broken up. It is therefore preferable that the solvent 11-2 of the second droplet 10-2 is prevented from reaching the particle aggregate 14-1 of the first droplet. In order to prevent the excessive spreading of the solvent 11-2, the following conditions are preferably satisfied:

$$L(P_1, C_2) \geq r\_max_2 \quad (9),$$

where $L(P_1, C_2)$ is a distance between the position $P_1$ and the position $C_2$. As shown in the state "C" of FIG. 6, "$C_2$" indicates the droplet depositing position of the second droplet 10-2, and "$P_1$" indicates the position of an edge of the particle aggregate 14-1 of the first droplet 10-1 on a line linking $C_1$ and $C_2$ (in other words, $P_1$ indicates the position of the outermost portion of the particle aggregate 14-1 of the first droplet 10-1 in the direction toward the droplet ejection position $C_2$, on the recording medium 13).

Thereupon, the particle aggregate 14-2 of the second droplet 10-2 unites with the particle aggregate 14-1 of the first droplet 10-1, resulting in the formation of the combined aggregate 16 as shown in the state "D" of FIG. 6. In order for the combined aggregate 16 to be formed, it is necessary that the solvent 11-1 of the first droplet and the solvent 11-2 of the second droplet come into contact with each other. Therefore, the following conditions are preferably satisfied to ensure that the solvent 11-1 of the first droplet makes contact with the solvent 11-2 of the second droplet:

$$L(C_1, C_2) \leq (r_1 + r\_max_2) \qquad (10).$$

As shown in the state "B" of FIG. 6, $L(C_1, C_2)$ indicates the distance between the droplet depositing position $C_1$ of the first droplet 10-1 and the droplet depositing position $C_2$ of the second droplet 10-2.

Figure 7:
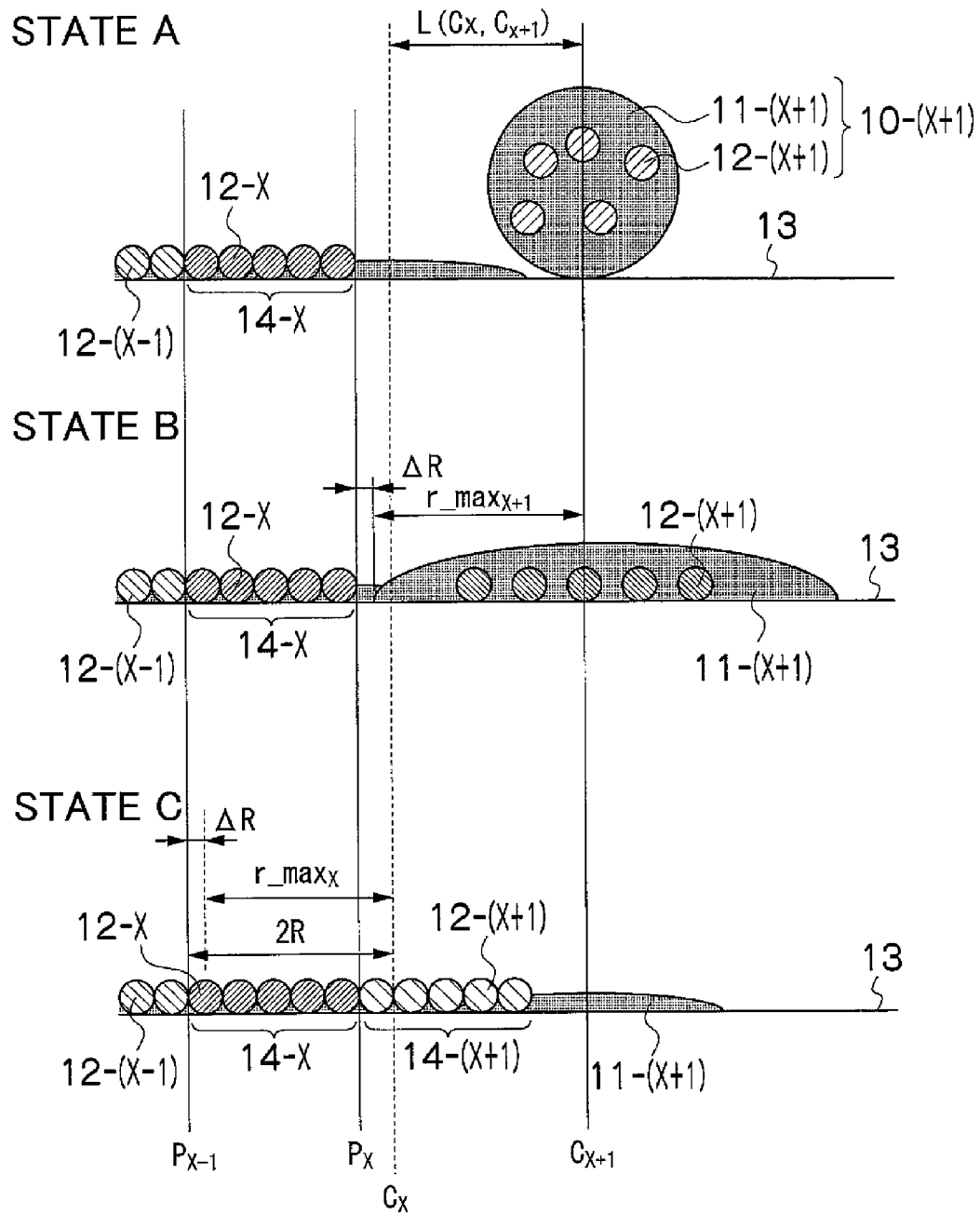
FIG. 7 is a diagram showing the distance between the deposited position of an Xth droplet and the deposited position of an (X+1)th droplet, when a plurality of droplets are deposited.

The above-described conditions apply not only to two liquid droplets 10 deposited on the recording medium 13, but also to adjacently deposited liquid droplets of three or more droplets deposited on the recording medium 13. FIG. 7 is a diagram showing a state of the adjacently deposited liquid droplets of the three or more deposited droplets. FIG. 7 is an illustrative diagram showing the distance between the droplet depositing positions of an Xth droplet 10-X and an (X+1)th droplet 10-(X+1).

Next, preferable conditions where three or more droplets are ejected consecutively will be described specifically. As described below, in order for the preferable conditions to be satisfied, the droplet depositing distance (also referred to as "droplet depositing interval") may be adjusted, the concentration of particles in the droplets may be adjusted, or the volume of the ejected droplets may be adjusted.

First, a first method of achieving the preferable conditions is described below. In this method, the droplet depositing distance is adjusted so as to achieve the preferable conditions. After the Xth droplet is ejected and deposited on the recording medium 13, the particles 12-X in the Xth droplet aggregate due to the self-organizing action, resulting in the formation of the particle aggregate 14-X (state "A" of FIG. 7). Next, the (X+1)th droplet is ejected and deposited on the recording medium 13, and the particles 12-(X+1) in the X+1)th droplet then unite with the particle aggregate 14-X having been formed due to the self-organizing action. In this case, the particles 12-(X+1) move toward the particle aggregate 14-X, and hence, the particle aggregate 14-(X+1) derived from the (X+1)th droplet has a central position which is displaced from the central droplet depositing position $C_{X+1}$ of the (X+1)th droplet 10-(X+1), as shown in the state "C" of FIG. 7.

FIG. 8 is a diagram showing the relationship between droplet depositing positions and positions of particle aggregates, when three or more liquid droplets are deposited consecutively. The maximum spreading radius $r\_max_1, r\_max_2, \ldots, r\_max_X, \ldots$, of the respective solvents 11-1, 11-2, …, 11-X, …, on the recording medium 13 is taken universally to be r. In FIG. 8, "$\Delta R$" indicates a distance between the position $P_x$ and the position of the outermost portion of the solvent 11-(X+1) at the time of maximumly spreading. In this case, $P_x$ is a position of the outermost portion of the particle aggregate 14-X of the Xth droplet, in the direction of the droplet depositing position $C_{X+1}$ of the (X+1)th droplet 10-(X+1)$P_x$. In other words, $\Delta R$ is expressed as $\Delta R = L(P_X, C_{X+1}) - r$. Furthermore, the spreading radius of the particle aggregates 14-1, 14-2, …, 14-X, … is taken universally to be R. Considering the X axis where $C_1 = 0$ as shown in FIG. 8, $P_x$ and $C_x$ are expressed by the following equations (11).

$$P_1 = R, \; C_2 = P_1 + \Delta R + r = R + \Delta R + r;$$

$$P_2 = P_1 + 2 \times R = 3 \times R, \; C_3 = P_2 + \Delta R + r = 3 \times R + \Delta R + r;$$

$$P_3 = P_2 + 2 \times R = 5 \times R, \; C_4 = P_3 + \Delta R + r = 5 \times R + \Delta R + r;$$

$$\ldots;$$

$$P_X = P_{X-1} + 2 \times R = (2 \times X - 1) \times R;$$

$$C_{X+1} = P_X + \Delta R + r = (2 \times X - 1) \times R + \Delta R + r;$$

$$\ldots \qquad (11).$$

Here, the distance between the centers of the liquid droplets $L(C_X, C_{X+1})$ can be expressed as follows:

$$L(C_1, C_2) = R + \Delta R + r;$$

$$L(C_2, C_3) = L(C_3, C_4) = \ldots = L(C_{X-1}, C_X) = \ldots = 2 \times R \qquad (12).$$

Furthermore, since r and R have a relationship of r>R, then $L(C_1, C_2)$ is greater than $L(C_2, C_3), L(C_3, C_4), \ldots, L(C_X, C_{X+1})$. In other words, the center-to-center distance between the first liquid droplet 10-1 and the second liquid droplet 10-2 is required to be greater than the center-to-center distance between the second liquid droplet 10-2 and the third liquid droplet 10-3, the center-to-center distance between the third liquid droplet 10-3 and the fourth liquid droplet 10-4 …, and the center-to-center distance between the Xth liquid droplet 10-X and the (X+1)th liquid droplet 10-(X+1).

Furthermore, since the relationship of $L(C_2, C_3) = L(C_3, C_4) = \ldots = L(C_X, C_{X+1}) = \ldots = 2 \times R$ (i.e., equation (12)) is satisfied, then the droplet depositing distance (i.e., droplet ejection interval) is preferably two times the spreading radius of the particle aggregates 14-1, 14-2, …, 14-X, … (i.e., it is preferable to adjust the droplet ejection interval between the second droplet 10-2 and subsequent droplets so as to achieve this relationship, in consideration of the particle concentration).

Droplet ejection of this kind can be achieved either by changing the interval between ejections, or by changing the relative speed between the head and the recording medium 13, but the former of these options is desirable since the latter method may give rise to a decline in productivity.

Next, a second method of achieving the preferable conditions is described below. The second method is different from the first method in that the second method changes the particle concentration in the respective liquid droplets so as to form desirable particle aggregates 14-1, 14-2, …, 14-X, …, while not changing the droplet ejection density (not changing the droplet ejection interval). Since the particle concentration in the respective liquid droplets is altered (and hence, the total number of the particles contained in one liquid droplet varies), then the radius of the particle aggregates 14-1, 14-2, …, 14-X varies accordingly. The radius of the Xth particle aggregate 14-X is taken to be Rx. Furthermore, the droplet ejection interval is taken to be c in all cases. The other symbols are taken to be the same as the first method described above. Considering the X axis where $C_1 = 0$, $C_x$ is expressed by the following equation:

$$C_2 = c, \; C_3 = 2 \times c, \ldots, C_X = (X-1) \times c, \ldots \qquad (13).$$

Also, $P_x$ is expressed by the following equation:

$$P_1 = C_2 - (r + \Delta R) = c - (r + \Delta R),$$

$$P_2 = C_3 - (r + \Delta R) = 2 \times c - (r + \Delta R),$$

$$\ldots,$$

$$P_X = C_{X+1} - (r + \Delta R) = X \times c - (r + \Delta R),$$

$$\ldots \qquad (14).$$

Here, the radius of the particle aggregates 14-1, 14-2, . . . , 14-X, . . . formed by the liquid droplets 10-1, 10-2, . . . , 10-X, . . . , can be expressed as follows:

$$R_1 = P_1 = c - (r + \Delta R),$$

$$R_2 = (P_2 - P_1)/2 = c/2,$$

$$R_3 = (P_3 - P_2)/2 = c/2,$$

$$\ldots,$$

$$R_X = (P_X - P_{X-1})/2 = c/2,$$

$$\ldots \quad (15).$$

When r and c have a relationship of r≦c/2, then the solvent of respective droplets does not come into mutual contact, and therefore it is necessary to ensure that r>c/2. Consequently, the following expression is obtained:

$$R_1 < R_2 = R_3 = \ldots = R_X = \ldots \quad (16).$$

Accordingly, the concentration of the particles 12-1 contained in the first liquid droplet 10-1 is required to be lower than the concentration of the particles 12-2, 12-3, . . . , 12-X, . . . contained in the second or subsequent droplets 10-2, 10-3, . . . , 10-X, and so on.

Furthermore, in order to satisfy the conditions of $R_2 = R_3 = \ldots = R_x = c/2$ derived from the equation (15), the particle concentration of the second and subsequent droplets 10-2, 10-3, . . . , 10-X, . . . are determined in consideration of the droplet depositing distance, so that the droplet depositing interval becomes two times the spreading radius of the particle aggregates 14-2, 14-3, . . . , 14-X, . . . of the second and subsequent droplets.

Droplet ejection of this kind can be achieved by providing nozzles which respectively ejects two types of liquid droplets having different particle concentrations. For example, one nozzle ejects only the first liquid droplet 10-1 of a low particle concentration, while another nozzle successively ejects the second and subsequent liquid droplets 10-2, 10-3, . . . , 10-X, of a high particle concentration.

Next, a third method of achieving the preferable conditions is described below. The third method is different from the first and second methods in that the volume of the respective liquid droplets are adjusted so as to form desirable particle aggregates 14-1, 14-2, . . . , 14-X, . . . , while not changing the droplet ejection interval and the particle concentration. Since the volume of the respective liquid droplets is varied, then the radius of the solvent or the radius of the particle aggregate changes accordingly, in the third method. The maximum spreading radius of the Xth solvent 11-X is $r\_max_X$. Furthermore, the droplet ejection distance is taken to be c in all cases. The other symbols are taken to be same as the first and second methods described above. Considering the X axis where $C_1 = 0$, $C_x$ is expressed by the following equation:

$$C_2 = c,$$

$$C_3 = 2 \times c,$$

$$\ldots,$$

$$C_x = (X-1) \times c,$$

$$\ldots \quad (17).$$

Also, $P_x$ is expressed by the following equation:

$$P_1 = C_2 - \{r\_max_2 + \Delta R\} = c - \{r\_max_2 + \Delta R\},$$

$$P_2 = C_3 - \{r\_max_3 + \Delta R\} = 2 \times c - \{r\_max_3 + \Delta R\},$$

$$\ldots,$$

$$P_X = C_{X+1} - \{r\_max_{X+1} + \Delta R\} = X \times c - \{r\_max_{X+1} + \Delta R\},$$

$$\ldots \quad (18).$$

The spreading radiuses, $R_1, R_2, \ldots, R_X, \ldots$ of the particle aggregates 14-1, 14-2, . . . , 14-X, . . . which are respectively derived from the liquid droplets 10-1, 10-2, . . . , 10-X, . . . , can be expressed as follows:

$$R_1 = P_1 = c - (r\_max_2 + \Delta R),$$

$$R_2 = \{P_2 - P_1\}/2 = \{c + r\_max_2 - r\_max_3\}/2,$$

$$R_3 = \{P_3 - P_2\}/2 = \{c + r\_max_3 - r\_max_4\}/2,$$

$$\ldots,$$

$$R_X = \{P_X - P_{X-1}\}/2 = \{c + r\_max_X - r\_max_{X+1}\}/2,$$

$$\ldots \quad (19).$$

Here, if it is taken that $r\_max_2 = r\_max_3 = \ldots \equiv r'$ (i.e., the volumes of the second and subsequent droplets 10-2, 10-3, . . . , 10-X, . . . are mutually equal), then the following expressions can be obtained:

$$R_1 = c - (r' + \Delta R),$$

$$R_2 = R_3 = \ldots = c/2 \quad (20).$$

When r' and c have a relationship of r'≦c/2, then the solvent of respective droplets does not come into mutual contact. It is hence necessary to ensure that r'>c/2. Accordingly, it is necessary that conditions of $R_1 < R_2 = R_3 = \ldots = R_X = \ldots$ are satisfied. Consequently, the liquid droplet volume of the first droplet 10-1 is required to be smaller than the liquid droplet volume of the second and subsequent droplets 10-2, 10-3, . . . , 10-X, and so on.

Furthermore, in order to satisfy the conditions of $R_2 = R_3 = \ldots = R_x = \ldots = c/2$, then the liquid droplet volume is adjusted in consideration of the particle concentration and the droplet ejection interval of the second and subsequent droplets 10-2, 10-3, . . . , 10-X, are determined so that the droplet depositing interval becomes two times the spreading radius of the particle aggregates 14-2, 14-3, . . . , 14-X, . . . of the second and subsequent droplets.

Droplet ejection of this kind can be achieved by providing two types of nozzles which respectively eject liquid droplets of different volumes, and ejecting only the first liquid droplet 10-1 from one type of the nozzles having a small ejection liquid droplet volume, while the second and subsequent liquid droplets 10-2, 10-3, . . . , 10-X, . . . are ejected successively from the other type of the nozzles having a large ejection liquid droplet volume. Alternatively, this can be achieved by using only one type of nozzle and instead changing the ejection signal of the head.

The following beneficial effects can be obtained by means of the first to third methods described above.

The liquid droplet deposition method, according to one embodiment of the present invention, of consecutively depositing a plurality of droplets 10 of liquid, which contains solvent 11 and particles 12 dispersed in the solvent 11 and having a substantially uniform size, onto a recording medium 13 includes the steps of: determining target positions at which the plurality of droplets are to be deposited on the recording medium; depositing an X-th droplet 10-X of the droplets at an X-th target position of the determined target positions on the recording medium 13, X being a natural number; and depositing an (X+1)-th droplet 10-(X+1) of the droplets at an (X+1)-th target position of the determined target positions on the recording medium 13 subsequently to the X-th droplet 10-X, after the particles 12-X contained in the X-th droplet 10-X are aggregated to form an X-th particle aggregate 14-X on the recording medium 13 due to liquid bridging force, wherein in the determining step, the target positions are determined so as to satisfy following conditions:

$$L(C_X, C_{X+1}) \leq r_X + r\_max_{X+1}, \text{ and}$$

$$L(P_X, C_{X+1}) \geq r\_max_{X+1},$$

where $C_X$ is the X-th target position, $C_{X+1}$ is the (X+1)-th target position, $L(C_X, C_{X+1})$ is a distance between $C_X$ and $C_{X+1}$, $r_X$ is a radius of the solvent 11-X of the X-th droplet 10-X on the recording medium 13 at a time of depositing the (X+1)-th droplet 10-(X+1) on the recording medium 13, $r\_max_{X+1}$ is a radius of the solvent 11-(X+1) of the (X+1)-th droplet at a time of maximumly spreading on the recording medium 13, $P_X$ is a position of an edge of the X-th particle aggregate 14-X on a line connecting $C_X$ and $C_{X+1}$, and $L(P_X, C_{X+1})$ is a distance between $P_X$ and $C_{X+1}$. Hence, there it is possible to prevent the solvent 11-(X+1) of the (X+1)th droplet 10-(X+1) from entering into the Xth particle aggregate 14-X, and the self-organized arrangement of the Xth particle aggregate 14-X is not broken down. Furthermore, the solvent 11-(X+1) of the (X+1)th droplet 10-(X+1) and the solvent 11-X of the Xth droplet 10-X reliably make contact with each other. Therefore, it is possible to form the respective aggregated particle bodies of mutually adjacent liquid droplets into a unified body.

Furthermore, since in the determining step, the target positions are determined so that $L(C_X, C_{X+1})$ is greater when X=1 than when X≧2 (in other words, conditions of $L(C_1, C_2) > L(C_2, C_3), L(C_3, C_4), \ldots, L(C_X, C_{X+1}), \ldots$, are satisfied), then the third aggregate body 14-3 unites with the combined aggregate 16 created by the first aggregate body 14-1 uniting with the second aggregate 14-2, and hence a combined aggregate 16 in which the first aggregate body 14-1, the second aggregate body 14-2 and the third aggregate body 14-3 are all united together, can be formed. A combined aggregate 16 can also be formed by uniting the fourth aggregate body 14-4 and subsequent aggregate bodies, and hence it is possible to form a line image reliably on the recording medium 13, without the occurrence of any shortfall in the supply of particles.

Furthermore, since in the determining step, the target positions are determined so that $L(C_X, C_{X+1})$ is equal to a diameter of the X-th particle aggregate, when X≧2, then it is possible to form a line image reliably on the recording medium 13, while maintaining a uniform supply volume of the particles 12.

Furthermore, since the X-th droplet for X=1 has a concentration of the particles lower than the X-th droplet for X≧2, then the third aggregate body 14-3 unites with the combined aggregate 16 created by the uniting of the first aggregate body 14-1 and the second aggregate body 14-2, and it is possible to form a combined aggregate 16 in which the first aggregate body 14-1, the second aggregate body 14-2 and the third aggregate body 14-3 are all united together A combined aggregate 16 can also be formed by uniting the fourth aggregate body 14-4 and subsequent aggregate bodies, and hence it is possible to form a line image reliably on the recording medium 13, without the occurrence of any shortfall in the supply of particles.

Furthermore, since the X-th droplet for X=1 has a volume smaller than the X-th droplet for X≧2, then the third aggregate body 14-3 unites with the combined aggregate 16 created by the uniting of the first aggregate body 14-1 and the second aggregate body 14-2, and it is possible to form a combined aggregate 16 in which the first aggregate body 14-1, the second aggregate body 14-2 and the third aggregate body 14-3 are all united together. A combined aggregate 16 can also be formed by uniting the fourth aggregate body 14-4 and subsequent aggregate bodies, and hence it is possible to form a line image reliably on the recording medium 13, without the occurrence of any shortfall in the supply of particles.

Moreover, the concentration of the X-th droplet for X≧2 is set so that the X-th particle aggregate for X≧2 has a diameter equal to $L(C_X, C_{X+1})$, or the volume of the X-th droplet for X≧2 is set so that the X-th particle aggregate for X≧2 has a diameter equal to $L(C_X, C_{X+1})$. It is therefore possible to form a line image reliably on the recording medium 13 while maintaining a uniform supply volume of the particles 12.

Furthermore, since a diameter D of the particles 12, a volume V of the droplet 10, and a contact angle θ of the liquid on the recording medium 13 have a relationship of $D > \{3 \times V \times (1-\cos\theta)/\pi/(2+\cos\theta)\}^{1/3}$, then a particle aggregate 14 can be formed more reliably due to the particles 12 aggregating by means of a liquid bridging force, on the recording medium 13.

Composition of Inkjet Recording Apparatus

Next, an inkjet recording apparatus is described as a concrete example of the application of an image forming apparatus which realizes the liquid deposition method described above.

FIG. 9 is a diagram of the general composition of an inkjet recording apparatus. As shown in FIG. 9, the inkjet recording apparatus 110 comprises: a print unit 112 having a plurality of heads 112K, 112C, 112M, and 112Y provided in correspondence to each of ink colors of black (K), cyan (C), magenta (M), and yellow (Y); an ink storing and loading unit 114 for storing inks of K, C, M and Y to be supplied to the heads 112K, 112C, 112M, and 112Y; a paper supply unit 118 for supplying recording paper 116, which is one example of the recording medium 13; a decurling unit 120 for removing curt in the recording paper 116; a belt conveyance unit 122 disposed facing the nozzle face (ink-droplet ejection face) of the print unit 112, for conveying the recording paper 116 while keeping the recording paper 116 flat; a print determination unit 124 for reading the printed result produced by the print unit 112; and a paper output unit 126 for outputting record-printed recording paper (printed matter) to the exterior.

The portions corresponding to the print unit 112 and the ink storing and loading unit 114 are included in the liquid deposition apparatus described above.

The ink storing and loading unit 114 has ink tanks for storing the inks to be supplied to the heads 112K, 112C, 112M, and 112Y, and the tanks are connected to the heads 112K, 112C, 112M, and 112Y by means of first ink flow channel 17 and second ink flow channel 18. The ink storing and loading unit 114 has a warning device (for example, a display device or an alarm sound generator) for warning when the remaining amount of any ink is low, and has a mechanism for preventing loading errors among the colors.

In FIG. 9, a magazine for rolled paper (continuous paper) is shown as an example of the paper supply unit 118; however, a plurality of magazines with paper differences such as paper width and quality may be jointly-provided. Moreover, papers may be supplied with cassettes that contain cut papers loaded in layers and that are used jointly or in lieu of the magazine for rolled paper.

The recording paper 116 delivered from the paper supply unit 118 retains curl due to having been loaded in the magazine. In order to remove the curl, heat is applied to the recording paper 116 in the decurling unit 120 by a heating drum 130 in the direction opposite from the curl direction in the magazine. In the case of the configuration in which roll paper is used, a cutter (first cutter) 128 is provided as shown in FIG. 9, and the continuous paper is cut into a desired size by the cutter 128. This cutter 128 is not required when using roll paper.

The decurled and cut recording paper 116 is delivered to the belt conveyance unit 122. The belt conveyance unit 122 has a configuration in which an endless belt 133 is set around rollers 131 and 132 so that the portion of the endless belt 133 facing at least the nozzle face of the print unit 112 and the sensor face of the print determination unit 124 forms a horizontal plane (flat plane).

The belt 133 has a width that is greater than the width of the recording paper 116, and a plurality of suction apertures (not shown) are formed on the belt surface. A suction chamber 134 is disposed in a position facing the sensor surface of the print determination unit 124 and the nozzle surface of the print unit 112 on the interior side of the belt 133, which is set around the rollers 131 and 132, as shown in FIG. 10. The suction chamber 134 provides suction with a fan 135 to generate a negative pressure, and the recording paper 116 is held on the belt 133 by suction. It is also possible to use an electrostatic attraction method, instead of a suction-based attraction method.

The belt 133 is driven in the clockwise direction in FIG. 9 by the motive force of a motor (reference numeral 88 in FIG. 14) being transmitted to at least one of the rollers 131 and 132, which the belt 133 is set around, and the recording paper 116 held on the belt 133 is conveyed from left to right in FIG. 10.

Since ink adheres to the belt 133 when a marginless print job or the like is performed, a belt-cleaning unit 136 is disposed in a predetermined position (a suitable position outside the printing area) on the exterior side of the belt 133.

A heating fan 140 is disposed on the upstream side of the print unit 112 in the conveyance pathway formed by the belt conveyance unit 122. The heating fan 140 blows heated air onto the recording paper 116 to heat the recording paper 116 immediately before printing so that the ink deposited on the recording paper 116 dries more easily.

The heads 112K, 112C, 112M and 112Y of the print unit 112 are full line heads having a length corresponding to the maximum width of the recording paper 116 used with the inkjet recording apparatus 110, and comprising a plurality of nozzles for ejecting ink arranged on a nozzle face through a length exceeding at least one edge of the maximum-size recording medium (namely, the full width of the printable range).

The print heads 112K, 112C, 112M and 112Y are arranged in color order (black (K), cyan (C), magenta (M), yellow (Y)) from the upstream side in the feed direction of the recording paper 116, and these respective heads 112K, 112C, 112M and 112Y are fixed extending in a direction substantially perpendicular to the conveyance direction of the recording paper 116.

A color image can be formed on the recording paper 116 by ejecting inks of different colors from the heads 112K, 112C, 112M and 112Y, respectively, onto the recording paper 116 while the recording paper 116 is conveyed by the belt conveyance unit 122.

By adopting a configuration in which the full line heads 112K, 112C, 112M and 112Y having nozzle rows covering the full paper width are provided for the respective colors in this way, it is possible to record an image on the full surface of the recording paper 116 by performing just one operation of relatively moving the recording paper 116 and the print unit 112 in the paper conveyance direction (the sub-scanning direction), in other words, by means of a single sub-scanning action. Higher-speed printing is thereby made possible and productivity can be improved in comparison with a shuttle type head configuration in which a head reciprocates in the main scanning direction.

Although the configuration with the KCMY four standard colors is described in the present embodiment, combinations of the ink colors and the number of colors are not limited to those. Light inks, dark inks or special color inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 124 shown in FIG. 9 has an image sensor (line sensor and area sensor) for capturing an image of the ink-droplet deposition result of the print unit 112, and functions as a device to check for ejection defects such as clogs, landing position error, and the like, of the nozzles, from the ink-droplet ejection results evaluated by the image sensor.

A CCD area sensor in which a plurality of photoreceptor elements (photoelectric transducers) are two-dimensionally arranged on the light receiving surface is suitable for use as the print determination unit 124 of the present example. An area sensor has an imaging range which is capable of capturing an image of at least the full area of the ink ejection width (image recording width) of the respective heads 112K, 112C, 112M and 112Y.

Furthermore, it is also possible to use a line sensor instead of the area sensor. In this case, a desirable composition is one in which the line sensor has rows of photoreceptor elements (rows of photoelectric transducing elements) with a width that is greater than the ink droplet ejection width (image recording width) of the respective heads 112K, 112C, 112M and 112Y. A test pattern or the target image printed by the print heads 112K, 112C, 112M, and 112Y of the respective colors is read in by the print determination unit 124, and the ejection performed by each head is determined. The ejection determination includes detection of the ejection, measurement of the dot size, and measurement of the dot formation position.

A post-drying unit 142 is disposed following the print determination unit 124. The post-drying unit 142 is a device to dry the printed image surface, and includes a heating fan, for example.

A heating/pressurizing unit 144 is disposed following the post-drying unit 142. The heating/pressurizing unit 144 is a device to control the glossiness of the image surface, and the image surface is pressed with a pressure roller 145 having a predetermined uneven surface shape while the image surface is heated, and the uneven shape is transferred to the image surface.

The printed matter generated in this manner is outputted from the paper output unit 126. The target print (i.e., the result of printing the target image) and the test print are preferably outputted separately. In the inkjet recording apparatus 110, a sorting device (not shown) is provided for switching the outputting pathways in order to sort the printed matter with the target print and the printed matter with the test print, and to send them to paper output units 126A and 126B, respectively. When the target print and the test print are simultaneously formed in parallel on the same large sheet of paper, the test print portion is cut and separated by a cutter (second cutter) 148.

Structure of the Head

Next, the structure of a head will be described. The heads 112K, 112C, 112M and 112Y of the respective ink colors have the same structure, and a reference numeral 50 is designated to any of the heads.

Figure 11A:
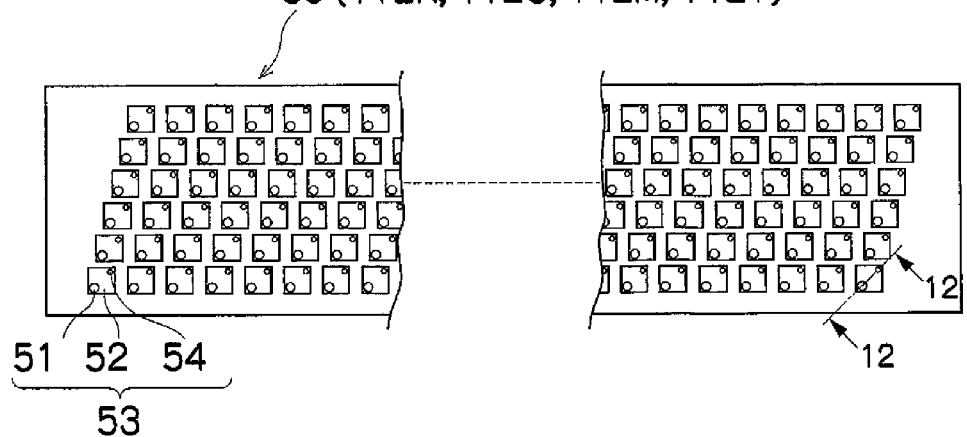
FIGS. 11A to 11C are plan view perspective diagrams showing an example of the structure of a head.
Figure 11B:
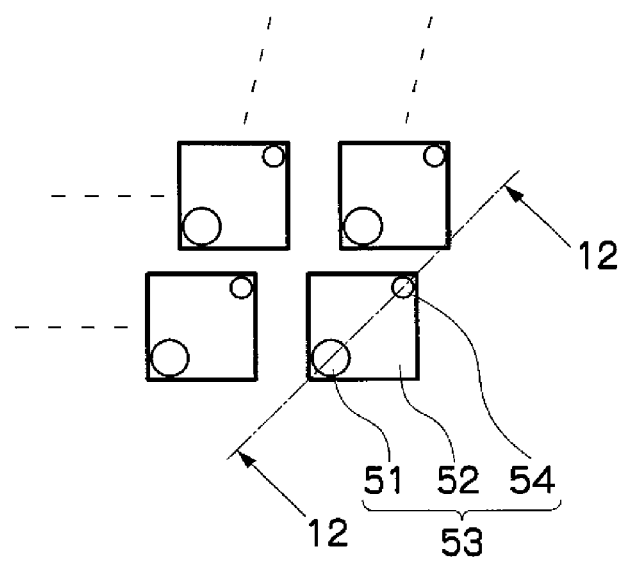
Figure 11C:
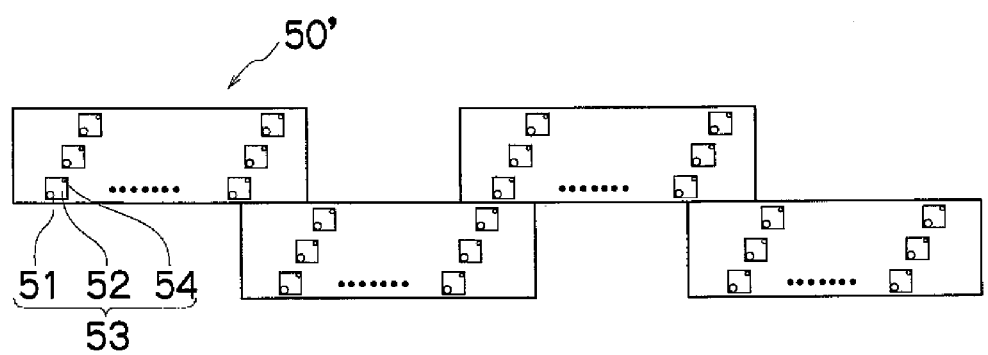
Figure 12:
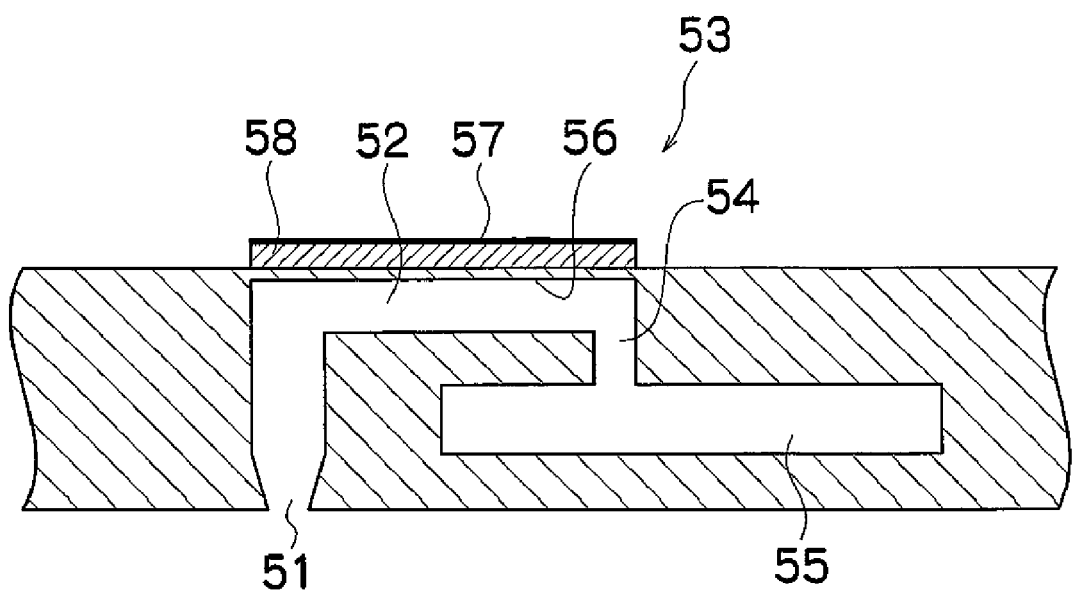
FIG. 12 is a cross-sectional view along line 12-12 in FIGS. 11A and 11B.

FIG. 11A is a perspective plan view showing an example of the configuration of the head 50, FIG. 11B is an enlarged view of a portion thereof, FIG. 11C is a perspective plan view showing another example of the configuration of the head 50, and FIG. 12 is a cross-sectional view taken along the line 12-12 in FIGS. 11A and 11B, showing the inner structure of a droplet ejection element (an ink chamber unit for one nozzle 51).

The nozzle pitch in the head 50 should be minimized in order to maximize the density of the dots printed on the surface of the recording paper 116. As shown in FIGS. 11A and 11B, the head 50 according to the present embodiment has a structure in which a plurality of ink chamber units 53, each comprising a nozzle 51 forming an ink ejection port, a pressure chamber 52 corresponding to the nozzle 51, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced and high nozzle density is achieved.

The mode of forming one or more nozzle rows through a length corresponding to the entire width of the recording paper 116 in a direction substantially perpendicular to the conveyance direction of the recording paper 116 is not limited to the example described above. For example, instead of the configuration in FIG. 11A, as shown in FIG. 11C, a line head having nozzle rows of a length corresponding to the entire width of the recording paper 116 can be formed by arranging and combining, in a staggered matrix, short head module 50' having a plurality of nozzles 51 arrayed in a two-dimensional fashion.

As shown in FIGS. 11A and 11B, the planar shape of the pressure chamber 52 provided for each nozzle 51 is substantially a square, and an outlet to the nozzle 51 is disposed at one corner on a diagonal line of the square and an inlet of supplied ink (supply port) 54 is disposed on the other corner on the diagonal line of the square.

The shape of the pressure chamber 52 is not limited to that of the present example and various modes are possible in which the planar shape is a quadrilateral shape (diamond shape, rectangular shape, or the like), a pentagonal shape, a hexagonal shape, or other polygonal shape, or a circular shape, elliptical shape, or the like.

The ink chamber unit 53 is constituted by a supply port 54, a pressure chamber 52, a nozzle 51, a pressurization plate 56, an individual electrode 57, an actuator 58, and the like. The respective pressure chambers 52 of the plurality of ink chamber units 53 are connected to the common flow channel 55. As shown in FIGS. 11A to 11C, each pressure chamber 52 is connected to a common channel 55 through the supply port 54. The common channel 55 is connected to an ink tank which is a base tank that supplies ink, and the ink supplied from the ink tank is delivered through the common flow channel 55 to the pressure chambers 52.

An actuator 58 provided with an individual electrode 57 is bonded to a pressure plate (a diaphragm that also serves as a common electrode) 56 which forms the surface of one portion (the ceiling in FIGS. 11A to 11C) of the pressure chambers 52. When a drive voltage is applied to the individual electrode 57 and the common electrode, the actuator 58 deforms, thereby changing the volume of the pressure chamber 52. This causes a pressure change which results in ink being ejected from the nozzle 51. For the actuator 58, it is possible to adopt a piezo electric element using a piezo electric body, such as lead zirconate titanate, barium titanate. When the displacement of the actuator 58 returns to its original position after ejecting ink, the pressure chamber 52 is replenished with new ink from the common flow channel 55 through the independent supply port 54.

As shown in FIG. 12, the high-density nozzle head according to the present embodiment is achieved by arranging a plurality of ink chamber units 53 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 53 are arranged at a uniform pitch d in line with a direction forming an angle of θ with respect to the main scanning direction, the pitch P of the nozzles projected so as to align in the main scanning direction is d×cos θ, and hence the nozzles 51 can be regarded to be equivalent to those arranged linearly at a fixed pitch P along the main scanning direction. Such configuration results in a nozzle structure in which the nozzle row projected in the main scanning direction has a high nozzle density of up to 2,400 nozzles per inch.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

Figure 13:
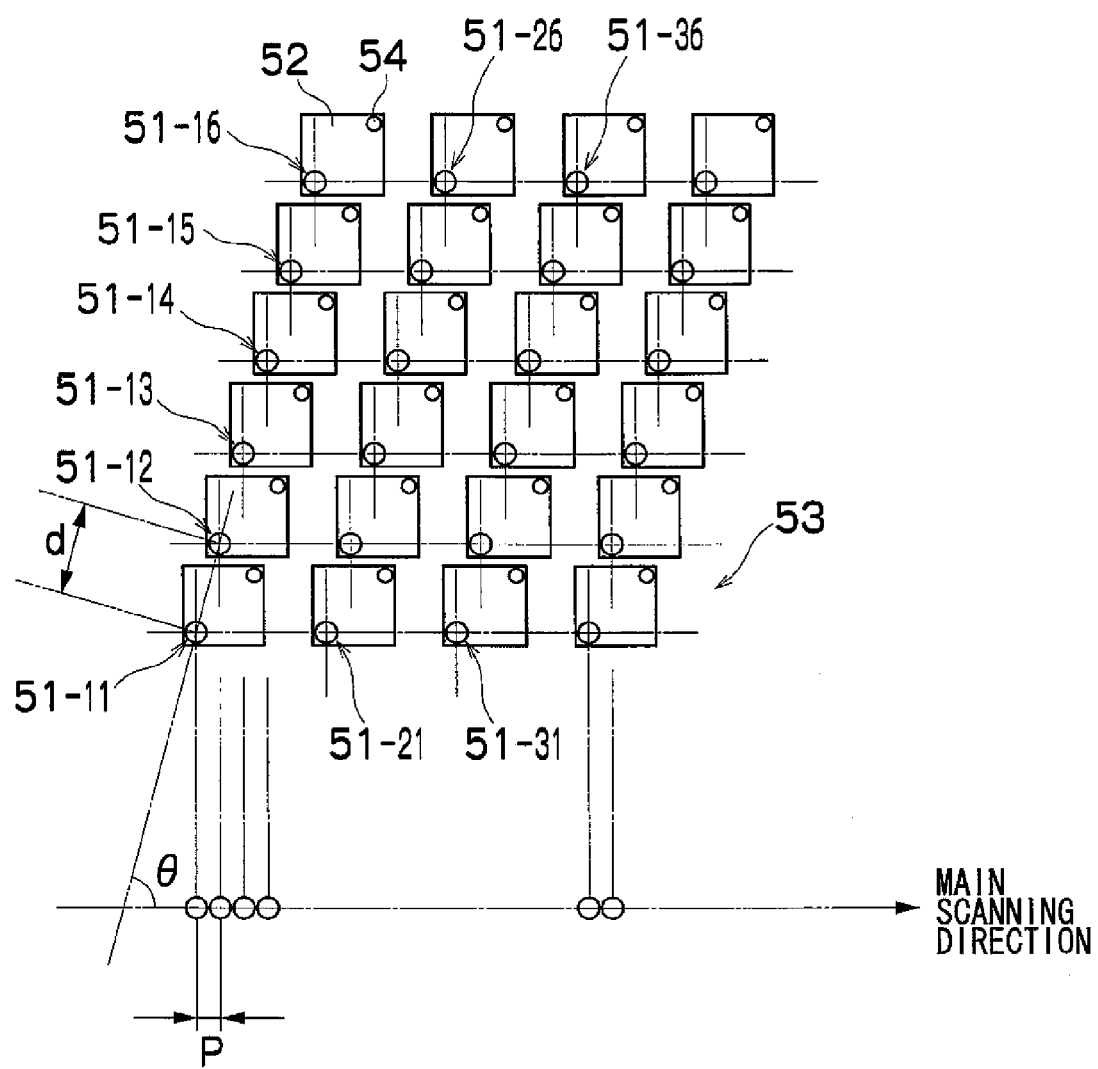
FIG. 13 is an enlarged diagram showing an example of the arrangement of nozzles in a head.

In particular, when the nozzles 51 arranged in a matrix such as that shown in FIG. 13 are driven, the main scanning according to the above-described (3) is preferred. More specifically, the nozzles 51-11, 51-12, 51-13, 51-14, 51-15 and 51-16 are treated as a block (additionally; the nozzles 51-21, ..., 51-26 are treated as another block; the nozzles 51-31, ..., 51-16 are treated as another block; ...); and one line is printed in the width direction of the recording paper 116 by sequentially driving the nozzles 51-11, 51-12, ..., 51-16 in accordance with the conveyance velocity of the recording paper 116.

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other.

The direction indicated by one line (or the lengthwise direction of a band-shaped region) recorded by main scanning as described above is called the "main scanning direction", and the direction in which sub-scanning is performed, is called the "sub-scanning direction". In other words, in the present embodiment, the conveyance direction of the recording paper 116 is called the sub-scanning direction and the direction perpendicular to same is called the main scanning direction.

In implementing the present invention, the arrangement of the nozzles is not limited to that of the example illustrated. Moreover, a method is employed in the present embodiment where an ink droplet is ejected by means of the deformation of the actuator 58, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

In forming a line image on a recording paper 116 by consecutive ejection, if the particle concentration in the liquid droplets is adjusted in the manner of the second method described above, then by preparing nozzles 51 of two types containing liquid droplets having different particle concentrations, the first droplet only can be ejected from the nozzle 51 having low particle concentration and the second and subsequent droplets can be ejected from the nozzle 51 having high particle concentration.

In forming a line image on a recording paper 116 by consecutive ejection, if the droplet volume of the ejected liquid droplets is adjusted in the manner of the third method described above, then by preparing nozzles 51 of two types having different ejected liquid droplet volumes, the first droplet only can be ejected from the nozzle 51 having a small ejected liquid droplet volume and the second and subsequent droplets can be ejected from the nozzle 51 having a large ejected liquid droplet volume.

Description of Control System

Figure 14:
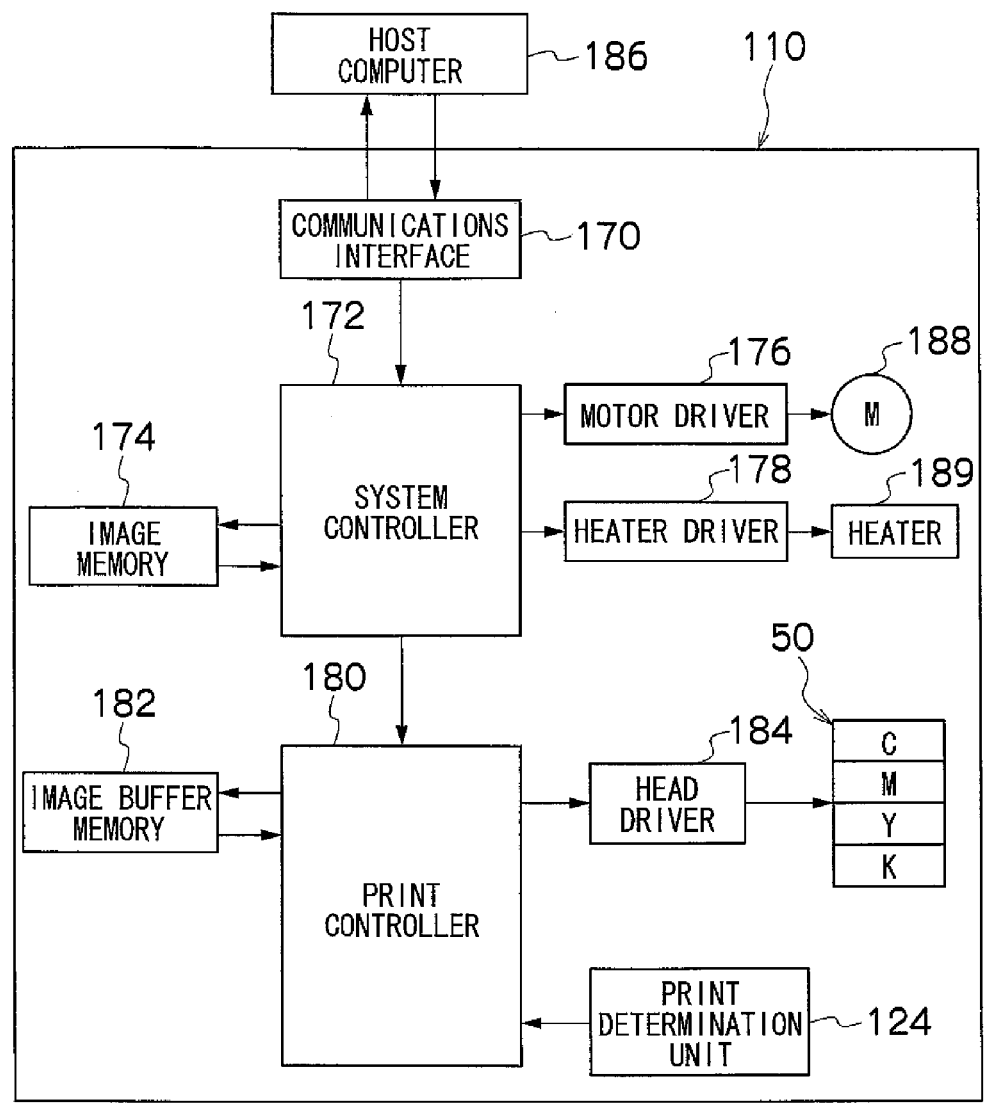
FIG. 14 is a block diagram showing the system composition of the inkjet recording apparatus.

FIG. 14 is a block diagram showing the system configuration of the inkjet recording apparatus 110. As shown in FIG. 14, the inkjet recording apparatus 110 comprises a communication interface 170, a system controller 172, an image memory 174, a ROM 175, a motor driver 176, a heater driver 178, a print controller 180, an image buffer memory 182, a head driver 184, and the like.

The communication interface 170 is an interface unit (image input unit) which functions as an image input device for receiving image data sent from a host computer 186. A serial interface such as USB (Universal Serial Bus), IEEE1394, Ethernet (registered trademark), wireless network, or a parallel interface such as a Centronics interface may be used as the communication interface 170. A buffer memory (not shown) may be mounted in this portion in order to increase the communication speed.

The image data sent from the host computer 186 is received by the inkjet recording apparatus 110 through the communication interface 170, and is temporarily stored in the image memory 174. The image memory 174 is a storage device for storing images inputted through the communication interface 170, and data is written and read to and from the image memory 174 through the system controller 172. The image memory 174 is not limited to a memory composed of semiconductor elements, and a hard disk drive or another magnetic medium may be used.

The system controller 172 is constituted by a central processing unit (CPU) and peripheral circuits thereof, and the like, and it functions as a control device for controlling the whole of the inkjet recording apparatus 110 in accordance with a prescribed program, as well as a calculation device for performing various calculations. More specifically, the system controller 172 controls the various sections, such as the communication interface 170, image memory 174, motor driver 176, heater driver 178, and the like, as well as controlling communications with the host computer 186 and writing and reading to and from the image memory 174 and ROM 175, and it also generates control signals for controlling the motor 188 and heater 189 of the conveyance system.

The program executed by the CPU of the system controller 172 and the various types of data which are required for control procedures are stored in the ROM 175. The ROM 175 may be a non-writeable storage device, or it may be a rewriteable storage device, such as an EEPROM.

The image memory 174 is used as a temporary storage region for the image data, and it is also used as a program development region and a calculation work region for the CPU.

The motor driver (drive circuit) 176 drives the motor 188 of the conveyance system in accordance with commands from the system controller 172. The heater driver (drive circuit) 178 drives the heater 189 of the post-drying unit 142 or the like in accordance with commands from the system controller 172.

The print controller 180 is a control unit which functions as a signal processing device for performing various treatment processes, corrections, and the like, in accordance with the control implemented by the system controller 172, in order to generate a signal for controlling droplet ejection from the image data (multiple-value input image data) in the image memory 174, as well as functioning as a drive control device which controls the ejection driving of the head 50 by supplying the ink ejection data thus generated to the head driver 184.

Furthermore, the print controller 180 also has the role of a device for calculating the conditions in the above-described method (first method) of adjusting the droplet ejection interval, the above-described method (second method) of adjusting the particle concentration in the droplets, and the above-described method (third method) of adjusting the volume of the droplets.

The image buffer memory 182 is provided in the print controller 180, and image data, parameters, and other data are temporarily stored in the image buffer memory 182 when image data is processed in the print controller 180. FIG. 14 shows a mode in which the image buffer memory 182 is attached to the print controller 180; however, the image memory 174 may also serve as the image buffer memory 182. Also possible is a mode in which the print controller 180 and the system controller 172 are integrated to form a single processor.

To give a general description of the sequence of processing from image input to print output, image data to be printed (original image data) is input from an external source via a communications interface 170, and is accumulated in the image memory 174. At this stage, multiple-value RGB image data is stored in the image memory 174, for example.

The print controller 180 performs processing for converting the input RGB image data into dot data for the four colors of K, C, M and Y. The dot data generated by the print controller 180 in this way is stored in the image buffer memory 182. This dot data of the respective colors is converted into CMYK droplet ejection data for ejecting ink from the nozzles of the head 50, thereby establishing the ink ejection data to be printed.

The head driver 184 outputs a drive signal for driving the actuators 58 corresponding to the nozzles 51 of the head 50 in accordance with the print contents, on the basis of the ink ejection data and the drive waveform signals supplied by the print controller 180. A feedback control system for maintaining constant drive conditions in the head may be included in the head driver 184.

By supplying the drive signal output by the head driver 184 to the head 50 in this way, ink is ejected from the corresponding nozzles 51. By controlling ink ejection from the print heads 50 in synchronization with the conveyance speed of the recording paper 116, an image is formed on the recording paper 116.

As described above, the recording volume and the ejection timing of the ink droplets from the respective nozzles are controlled via the head driver 184, on the basis of the ink ejection data generated by implementing prescribed signal processing in the print controller 180, and the drive signal waveform. By this means, prescribed dot sizes and dot positions can be achieved.

The print determination unit 124 is a block that includes the image sensor as described above with reference to FIG. 9, reads the image printed on the recording paper 116, determines the print conditions (presence of the ejection, variation in the dot formation, optical density, and the like) by performing desired signal processing, or the like, and provides the determination results of the print conditions to the print controller 180 and the system controller 172.

The print controller 180 implements various corrections with respect to the head 50, on the basis of the information obtained from the print determination unit 124, according to requirements, and it implements control for carrying out cleaning operations (nozzle restoring operations), such as preliminary ejection, suctioning, or wiping, as and when necessary.

The liquid droplet deposition method according to the present invention has been described in detail above, but the present invention is not limited to the aforementioned embodiments, and it is of course possible for improvements or modifications of various kinds to be implemented, within a range which does not deviate from the essence of the present invention.

The present invention can be applied to forming conductors, such as a wiring arrangement, electrodes, or the like, on a substrate, by using electrically conductive particles for the particles 12. In this case, by setting the diameter of the particles 12 to be several hundred nm to several μm, it is possible to make the number of particle interfaces per unit length of the conductor much smaller compared to a case where a conductor is printed by a inkjet method in the related art(in the related art, the particle size is several nm to several tens of nm). Consequently, it is possible to achieve a small electrical resistance.

Furthermore, if particles 12 having acid resistant properties are used, then it is possible to use the deposited particles as a resist film.

If used in these applications (conductor printing, resist printing), desirably, after forming self-assembled particles 12 on a substrate, the particles are fused together by means of a heating device, or the like.

Of course, if a pigment is used as the particles 12, then the present invention can also be used as a method for manufacturing a so-called printed object, such as text or a photograph. Furthermore, if red, green and blue particles are used, then the present invention can also be applied to the manufacture of a color filter which is used in a liquid crystal display, or the like. In the case of these applications, if the particle diameter is large, then the light scattering is increased and the range of color reproduction may decline. In order to prevent this, it is desirable that the diameter of the particles should be set approximately to 1/several to 1/10 of the wavelength of the light (in this case, visible light). Although it is of course possible, in principle, to form the particle aggregate 14 described thus far by using these particles directly, in this case, the angle of contact of the solvent 11 must be made remarkably small, or the volume of the liquid droplets 10 must be made remarkably small, which is not practicable.

Hence, if used in applications of this kind, a particle aggregate 14 should be formed by depositing pigments having a size of approximately several ten nm to hundred nm onto the surface of large particles 12 having a size of approximately 1 μm.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A liquid droplet deposition method of consecutively depositing a plurality of droplets of liquid onto a recording medium, the liquid containing solvent and particles dispersed in the solvent, the particles having a substantially uniform size, the method comprising the steps of:
determining target positions at which the plurality of droplets are to be deposited on the recording medium;
depositing an X-th droplet of the droplets at an X-th target position of the determined target positions on the recording medium, X being a natural number; and
depositing an (X+1)-th droplet of the droplets at an (X+1)-th target position of the determined target positions on the recording medium subsequently to the X-th droplet, after the particles contained in the X-th droplet are aggregated to form an X-th particle aggregate on the recording medium due to liquid bridging force,
wherein in the determining step, the target positions are determined so as to satisfy following conditions:

$$L(C_X, C_{X+1}) \leq r_X + r\_max_{X+1}, \text{ and}$$

$$L(P_X, C_{X+1}) \geq r\_max_{X+1},$$

where $C_X$ is the X-th target position, $C_{X+1}$ is the (X+1)-th target position, $L(C_X, C_{X+1})$ is a distance between $C_X$ and $C_{X+1}$, $r_X$ is a radius of the solvent of the X-th droplet on the recording medium at a time of depositing the (X+1)-th droplet on the recording medium, $r\_max_{X+1}$ is a radius of the solvent of the (X+1)-th droplet at a time of maximumly spreading on the recording medium, $P_X$ is a position of an edge of the X-th particle aggregate on a line connecting $C_X$ and $C_{X+1}$, and $L(P_X, C_{X+1})$ is a distance between $P_X$ and $C_{X+1}$.

2. The liquid droplet deposition method as defined in claim 1, wherein in the determining step, the target positions are determined so that $L(C_X, C_{X+1})$ is greater when X=1 than when X≧2.

3. The liquid droplet deposition method as defined in claim 1, wherein in the determining step, the target positions are determined so that $L(C_X, C_{X+1})$ is equal to a diameter of the X-th particle aggregate, when X≧2.

4. The liquid droplet deposition method as defined in claim 1, wherein the X-th droplet for X=1 has a concentration of the particles lower than the X-th droplet for X≧2.

5. The liquid droplet deposition method as defined in claim 1, wherein the X-th droplet for X=1 has a volume smaller than the X-th droplet for X≧2.

6. The liquid droplet deposition method as defined in claim 4, wherein the concentration of the X-th droplet for X≧2 is set so that the X-th particle aggregate for X≧2 has a diameter equal to $L(C_X, C_{X+1})$.

7. The liquid droplet deposition method as defined in claim 5, wherein the volume of the X-th droplet for X≧2 is set so that the X-th particle aggregate for X≧2 has a diameter equal to $L(C_X, C_{X+1})$.

8. The liquid droplet deposition method as defined in claim 1, wherein a diameter D of the particles, a volume V of the droplet, and a contact angle θ of the liquid on the recording medium have a relationship of $D>\{3\times V\times(1-\cos\theta)/\pi/(2+\cos\theta)\}^{1/3}$.

9. A liquid droplet deposition apparatus comprising:

an ejection head which ejects and deposits a plurality of droplets of liquid onto a recording medium, the liquid containing solvent and particles dispersed in the solvent, the particles having a substantially uniform size; and a control device which determines target positions at which the plurality of droplets are to be deposited on the recording medium, and controls the ejection head to deposit an X-th droplet of the droplets at an X-th target position of the determined target positions and to deposit an (X+1)-th droplet of the droplets at an (X+1)-th target position of the determined target positions subsequently to the X-th droplet, X being a natural number, the (X+1)-th droplet being deposited after the particles contained in the X-th droplet are aggregated to form an X-th particle aggregate on the recording medium due to liquid bridging force, wherein the control device determines the target positions so as to satisfy following conditions:

$$L(C_X, C_{X+1}) \leq r_X + r\_max_{X+1}, \text{ and}$$

$$L(P_X, C_{X+1}) \geq r\_max_{X+1},$$

where $C_X$ is the X-th target position, $C_{X+1}$ is the (X+1)-th target position, $L(C_X, C_{X+1})$ is a distance between $C_X$ and $C_{X+1}$, $r_X$ is a radius of the solvent of the X-th droplet on the recording medium at a time of depositing the (X+1)-th droplet on the recording medium, $r\_max_{X+1}$ is a radius of the solvent of the (X+1)-th droplet at a time of maximumly spreading on the recording medium, $P_X$ is a position of an edge of the X-th particle aggregate on a line connecting $C_X$ and $C_{X+1}$, and $L(P_X, C_X+j)$ is a distance between $P_X$ and $C_{X+1}$.

10. The liquid droplet deposition apparatus as defined in claim 9, wherein the control device determines the target positions so that $L(C_X, C_{X+1})$ is greater when X=1 than when X≧2.

11. The liquid droplet deposition apparatus as defined in claim 9, wherein the control device determines the target positions so that $L(C_X, C_{X+1})$ is equal to a diameter of the X-th particle aggregate, when X≧2.

12. The liquid droplet deposition apparatus as defined in claim 9, wherein the control device controls the ejection head so that the X-th droplet for X=1 has a concentration of the particles lower than the X-th droplet for X≧2.

13. The liquid droplet deposition apparatus as defined in claim 9, wherein the control device controls the ejection head so that the X-th droplet for X=1 has a volume smaller than the X-th droplet for X≧2.

14. The liquid droplet deposition apparatus as defined in claim 12, wherein the concentration of the particles in the X-th droplet for X≧2 is set so that the X-th particle aggregate for X≧2 has a diameter equal to $L(C_X, C_{X+1})$.

15. The liquid droplet deposition apparatus as defined in claim 13, wherein the volume of the X-th droplet for X≧2 is set so that the X-th particle aggregate for X≧2 has a diameter equal to $L(C_X, C_{X+1})$.

16. The liquid droplet deposition apparatus as defined in claim 9, wherein the control device controls the ejection head so that a volume V of the droplet, a diameter D of the particles, and a contact angle θ of the liquid on the recording medium have a relationship of $D>\{3\times V\times(1-\cos\theta)/\pi/(2+\cos\theta)\}^{1/3}$.

\* \* \* \* \*